United States Patent
Matsuzawa

(10) Patent No.: US 10,127,687 B2
(45) Date of Patent: Nov. 13, 2018

(54) CALIBRATION DEVICE, CALIBRATION METHOD, OPTICAL DEVICE, IMAGE-CAPTURING DEVICE, PROJECTION DEVICE, MEASURING SYSTEM, AND MEASURING METHOD

(71) Applicant: OLYMPUS CORPORATION, Tokyo (JP)

(72) Inventor: Toshiaki Matsuzawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 14 days.

(21) Appl. No.: 15/590,175

(22) Filed: May 9, 2017

(65) Prior Publication Data

US 2017/0243374 A1 Aug. 24, 2017

Related U.S. Application Data

(63) Continuation of application No. PCT/JP2015/081886, filed on Nov. 12, 2015.

(30) Foreign Application Priority Data

Nov. 13, 2014 (JP) ................................ 2014-230957

(51) Int. Cl.
*H04B 10/00* (2013.01)
*G06T 7/80* (2017.01)
(Continued)

(52) U.S. Cl.
CPC .............. *G06T 7/80* (2017.01); *G01B 11/00* (2013.01); *G06K 9/32* (2013.01); *G06K 9/4661* (2013.01);
(Continued)

(58) Field of Classification Search
USPC ....................................................... 398/9–38
See application file for complete search history.

(56) References Cited

U.S. PATENT DOCUMENTS

| 6,005,958 A | 12/1999 | Farmer et al. |
| 6,063,023 A | 5/2000 | Sakiyama et al. |

(Continued)

FOREIGN PATENT DOCUMENTS

| EP | 1270329 A2 | 1/2003 |
| EP | 1434169 A2 | 6/2004 |

(Continued)

OTHER PUBLICATIONS

"Digital Image Processing", pp. 252-256, Computer Graphic Arts Society, published Jul. 22, 2004, with partial translation.

(Continued)

*Primary Examiner* — Agustin Bello
(74) *Attorney, Agent, or Firm* — Scully, Scott, Murphy & Presser, P.C.

(57) ABSTRACT

A calibration device for an optical device including a two-dimensional image conversion element having a plurality of pixels and an optical system that forms an image-formation relationship between the image conversion element and the three-dimensional world coordinate space. The calibration device includes: a calibration-data acquisition unit that acquires calibration data representing the correspondence between two-dimensional pixel coordinates in the image conversion element and three-dimensional world coordinates in the world coordinate space; and a parameter calculating unit that calculates parameters of a camera model by applying, to the calibration data acquired by the calibration-data acquisition unit, a camera model in which two coordinate values of the three-dimensional world coordinates are expressed as functions of the other one coordi- (Continued)

nate value of the world coordinates and the two coordinate values of the two-dimensional pixel coordinates.

31 Claims, 11 Drawing Sheets

(51) Int. Cl.
  *G01B 11/00* (2006.01)
  *G06K 9/32* (2006.01)
  *G06K 9/46* (2006.01)
  *G06T 5/00* (2006.01)
  *H04N 5/232* (2006.01)
  *H04N 17/00* (2006.01)

(52) U.S. Cl.
  CPC ............ *G06T 5/006* (2013.01); *H04N 5/232* (2013.01); *H04N 17/002* (2013.01)

(56) References Cited

U.S. PATENT DOCUMENTS

| | | | |
|---|---|---|---|
| 6,442,293 | B1 | 8/2002 | Ito et al. |
| 8,121,433 | B2 * | 2/2012 | Leprince ................ G01C 11/02 342/355 |
| 9,784,576 | B2 * | 10/2017 | Chang ...................... G01C 3/08 |
| 10,012,733 | B2 * | 7/2018 | Barrows ................ G01S 17/42 |
| 2002/0191078 | A1 | 12/2002 | Okamoto et al. |
| 2002/0191839 | A1 | 12/2002 | Ito et al. |
| 2004/0066454 | A1 | 4/2004 | Otani et al. |
| 2004/0131248 | A1 | 7/2004 | Ito et al. |
| 2004/0170315 | A1 | 9/2004 | Kosaka et al. |
| 2004/0202380 | A1 | 10/2004 | Kohler et al. |
| 2005/0013504 | A1 | 1/2005 | Noma et al. |
| 2005/0014996 | A1 | 1/2005 | Konomura et al. |
| 2005/0117033 | A1 | 6/2005 | Matsui |
| 2005/0237385 | A1 | 10/2005 | Kosaka et al. |
| 2008/0031514 | A1 | 2/2008 | Kakinami |
| 2009/0080706 | A1 * | 3/2009 | Tao ........................ G01N 21/94 382/110 |
| 2009/0129628 | A1 | 5/2009 | Mirbach et al. |
| 2009/0174775 | A1 | 7/2009 | Okamoto et al. |
| 2009/0324009 | A1 * | 12/2009 | Schulz ...................... G06T 7/73 382/103 |
| 2011/0310255 | A1 | 12/2011 | Medeiros et al. |
| 2012/0002057 | A1 | 1/2012 | Kakinami |
| 2012/0218413 | A1 | 8/2012 | Okamoto et al. |
| 2014/0085409 | A1 | 3/2014 | Zhang et al. |
| 2014/0362205 | A1 | 12/2014 | Sasaki |
| 2017/0085860 | A1 * | 3/2017 | Zhang .................. H04N 17/002 |
| 2017/0161943 | A1 * | 6/2017 | Lam .......................... G06T 7/20 |
| 2017/0221226 | A1 * | 8/2017 | Shen .......................... G06T 7/80 |
| 2017/0243374 | A1 * | 8/2017 | Matsuzawa ............ G01B 11/00 |
| 2017/0287166 | A1 * | 10/2017 | Claveau ................... G06T 7/80 |
| 2017/0352161 | A1 * | 12/2017 | Ganapati ................ G06T 7/521 |
| 2017/0355214 | A1 * | 12/2017 | Okada ...................... G07D 7/12 |
| 2017/0367766 | A1 * | 12/2017 | Mahfouz ................ A61B 34/10 |
| 2018/0066936 | A9 * | 3/2018 | Boyle ........................ G06T 7/30 |
| 2018/0075602 | A1 * | 3/2018 | Shen ...................... G06T 7/0051 |
| 2018/0130224 | A1 * | 5/2018 | Hoelscher ............ G06N 99/005 |
| 2018/0182083 | A1 * | 6/2018 | Natroshvili ............... G06T 5/20 |
| 2018/0188891 | A1 * | 7/2018 | Nakama ................ G06F 3/0425 |

FOREIGN PATENT DOCUMENTS

| | | |
|---|---|---|
| JP | S62-080768 A | 4/1987 |
| JP | S64-026813 A | 1/1989 |
| JP | H06-229931 A | 8/1994 |
| JP | H10-248806 A | 9/1998 |
| JP | 2000-292166 A | 10/2000 |
| JP | 2002-109518 A | 4/2002 |
| JP | 2002-513358 A | 5/2002 |
| JP | 2002-202122 A | 7/2002 |
| JP | 2002-374523 A | 12/2002 |
| JP | 2003-308526 A | 10/2003 |
| JP | 2004-037270 A | 2/2004 |
| JP | 2004-213332 A | 7/2004 |
| JP | 2004-530202 A | 9/2004 |
| JP | 2004-313241 A | 11/2004 |
| JP | 2004-354256 A | 12/2004 |
| JP | 2004-354257 A | 12/2004 |
| JP | 2005-003463 A | 1/2005 |
| JP | 2005-017288 A | 1/2005 |
| JP | 2005-167517 A | 6/2005 |
| JP | 2006-148745 A | 6/2006 |
| JP | 2006-267026 A | 10/2006 |
| JP | 2006-349443 A | 12/2006 |
| JP | 2007-012889 A | 1/2007 |
| JP | 2007-122328 A | 5/2007 |
| JP | 2007-292619 A | 11/2007 |
| JP | 2008-522268 A | 6/2008 |
| JP | 2009-276233 A | 11/2009 |
| JP | 2010-218226 A | 9/2010 |
| JP | 2010-231395 A | 10/2010 |
| JP | 2010-287156 A | 12/2010 |
| JP | 2011-101265 A | 5/2011 |
| JP | 2011-180084 A | 9/2011 |
| JP | 2012-526995 A | 11/2012 |
| JP | 2013-036831 A | 2/2013 |
| JP | 2013-179581 A | 9/2013 |
| WO | WO 98/48372 A1 | 10/1998 |
| WO | WO2006/058872 A1 | 6/2006 |
| WO | WO 2010/132791 A1 | 11/2010 |

OTHER PUBLICATIONS

Brown, D.C., "Close-Range Camera Calibration", Photogrammetric Engineering 37, published 1971, pp. 855-866.
Bradski, Gary, et al., "Learning OpenCV", published Sep. 2008, pp. 319-321, O'Reilly Media, Inc.
Heikkilae, Janne, "Geometric Camera Calibration using Circular Control Points", IEEE Transactions on Pattern Analysis and Machine Intelligence, vol. 20, published in 2000, pp. 1066-1074.
Tsai, R.Y., "A Versatile Camera Calibration Technique for High-Accuracy 3D Machine Vision Metrology Using Off-the-Shelf TV Cameras and Lenses", IEEE J. Robotics and Automation, vol. RA-3, No. 4, published in Aug. 1987, pp. 323-344.
Aoyama, C., "Camera Calibration by Ray Tracing", Honda R&D Technical Review, vol. 17, No. 1, published Mar. 1, 2005, pp. 138-145, Honda R&D Co.,Ltd., with English Abstract.
International Search Report dated Jan. 19, 2016 issued in PCT/JP2015/081886.
Motai, Y. et al., "Hand-Eye Calibration Applied to Viewpoint Selection for Robotic Vision", IEEE Transactions on Industrial Electronics, IEEE Service Center, Piscataway, NJ, USA, Oct. 1, 2008, vol. 55, No. 10, pp. 3731-3741.
Matsuzawa, T.,"Image field distribution model of wavefront aberration and models of distortion and field curvature", Journal of the Optical Society of America A, Feb. 1, 2011, vol. 28, No. 2, pp. 96-110.
Extended Supplementary European Search Report dated Jun. 6, 2018 in European Patent Application No. 15 85 8359.1.

* cited by examiner

CALIBRATION DEVICE, CALIBRATION METHOD, OPTICAL DEVICE, IMAGE-CAPTURING DEVICE, PROJECTION DEVICE, MEASURING SYSTEM, AND MEASURING METHOD

CROSS-REFERENCE TO RELATED APPLICATIONS

This is a continuation of International Application PCT/JP2015/081886, with an international filing date of Nov. 12, 2015, which is hereby incorporated by reference herein in its entirety. This application claims the benefit of Japanese Patent Application No. 2014-230957, the content of which is incorporated herein by reference.

TECHNICAL FIELD

The present invention relates to a calibration device, a calibration method, an optical device, an image-acquisition device, a projection device, a measuring system, and a measuring method.

BACKGROUND ART

Conventionally, a calibration device that performs camera calibration of an image-acquisition device or a projection device is known (for example, see PTL 1). A camera model includes a plurality of unknown parameters (camera parameters). By obtaining the camera parameters with the calibration device, it is possible to mathematically obtain backprojection lines in the real world corresponding to two-dimensional coordinates in an image.

Here, the conventional camera calibration, disclosed in PTL 1 and NTL 1, will be described. The camera calibration is performed in the following procedure by using a mathematical camera model that expresses a process in which three-dimensional coordinates in the real world are image-captured by a camera and are converted into two-dimensional coordinates in an image. First, using Expression 1, three-dimensional coordinates in the real world (hereinbelow, world coordinates) (x, y, z) are projected on normalized image plane coordinates (up, vp).

$$\begin{cases} u_p = \dfrac{r_{11}x + r_{12}y + r_{13}z + t_x}{r_{31}x + r_{32}y + r_{33}z + t_z} \\ v_p = \dfrac{r_{21}x + r_{22}y + r_{23}z + t_y}{r_{31}x + r_{32}y + r_{33}z + t_z} \end{cases} \quad \{\text{Expression 1}\}$$

$$R = \begin{pmatrix} r_{11} & r_{12} & r_{13} \\ r_{21} & r_{22} & r_{23} \\ r_{31} & r_{32} & r_{33} \end{pmatrix}, \; T = \begin{pmatrix} t_x \\ t_y \\ t_z \end{pmatrix} \quad \{\text{Expression 2}\}$$

Note that the rotation matrix R and the translation vector T in Expression 2 express three-dimensional coordinate conversion from the world coordinates to the camera coordinates. These are the values showing the position and orientation of the camera with respect to the world coordinates and are called "extrinsic parameters".

Note that Expression 1 is based on an assumption that all backprojection lines intersect at the optical center of the camera. Next, using Expression 3, coordinates (ud, vd) obtained by adding distortion to the normalized image plane coordinates (up, vp) are obtained.

$$\begin{cases} u_d = u_p + g_1(u_p^2 + v_p^2) + g_3 u_p^2 + g_4 u_p v_p + k_1 u_p (u_p^2 + v_p^2) \\ v_d = v_p + g_2(u_p^2 + v_p^2) + g_3 u_p v_p + g_4 v_p^2 + k_1 v_p (u_p^2 + v_p^2) \end{cases} \quad \{\text{Expression 3}\}$$

Note that (g1, g2, g3, g4, k1) are distortion parameters. Furthermore, using Expression 4, the normalized image plane coordinates (ud, vd) obtained by adding the distortion are converted into pixel-unit-based pixel coordinates (u, v).

$$\begin{cases} u = \alpha_u u_d + u_0 \\ v = \alpha_v v_d + v_0 \end{cases} \quad \{\text{Expression 4}\}$$

In a standard camera model, conversion from the world coordinates (x, y, z), obtained by image-acquisition with the camera, into the pixel coordinates (u, v) is expressed with Expressions 1 to 4 in this way. Because parameters ($\alpha u$, $\alpha v$, u0, v0, g1, g2, g3, g4, k1) in Expression 3 and Expression 4 represent the properties of the camera itself, they are called "intrinsic parameters".

The distortion parameters are variously defined according to the usage. For example, although Expression 3 expresses a model in which distortion of up to third order is taken into consideration, a model in which a term of a higher order, such as a fifth, a seventh, or a higher order, is added, is also used. Among them, a representative distortion model is Brown's model disclosed in NPL 2, shown in Expression 5.

$$\begin{pmatrix} u_d \\ v_d \end{pmatrix} = \begin{pmatrix} u_p \\ v_p \end{pmatrix} + \quad \{\text{Expression 5}\}$$

$$(k_1 r_p^2 + k_2 r_p^4 + k_3 r_p^6 + \ldots)\begin{pmatrix} u_p \\ v_p \end{pmatrix} + \left[ p_1 \begin{pmatrix} r_p^2 + 2u_p^2 \\ 2u_p v_p \end{pmatrix} + \right.$$

$$\left. p_2 \begin{pmatrix} 2u_p v_p \\ r_p^2 + 2v_p^2 \end{pmatrix} \right](1 + p_3 r_p^2 + \ldots )$$

where $r_p^2 = u_p^2 + v_p^2$

In Brown's model, distortion is represented by parameters (k1, k2, k3, ... ) of rotationally symmetrical radial distortion and parameters (p1, p2, p3, ... ) of rotationally asymmetrical tangential distortion.

Typically, in camera calibration, an image of a calibration chart having a plurality of feature points whose world coordinates (x, y, z) are known is captured with a camera. Subsequently, through image processing, the pixel coordinates (u, v) at which the feature points are image-captured are acquired. In this way, a plurality of measurement data representing the correspondence between the world coordinates (x, y, z) and the pixel coordinates (u, v) are obtained, thereby obtaining the camera parameters.

CITATION LIST

Patent Literature

{PTL 1} Japanese Unexamined Patent Application, Publication No. 2004-213332

Non Patent Literature

{NPL 1} "Digital image processing", CG-ARTS Society, 2004, p. 2 52-256

{NPL 2} D. C. Brown, "Close-Range Camera Calibration", Photogramm, Eng. 37, 855-866, 1971

SUMMARY OF INVENTION

An aspect of the present invention is a calibration device for an optical device provided with a two-dimensional image conversion element having a plurality of pixels, and an optical system that forms an image-formation relationship between the image conversion element and the three-dimensional world coordinate space. The calibration device includes: a calibration-data acquisition unit that acquires calibration data representing the correspondence between two-dimensional pixel coordinates in the image conversion element and three-dimensional world coordinates in the world coordinate space; and a parameter calculating unit that calculates parameters of a camera model by applying, to the calibration data acquired by the calibration-data acquisition unit, a camera model that expresses two coordinate values of the three-dimensional world coordinates as functions of the other one coordinate value of the world coordinates and the two coordinate values of the two-dimensional pixel coordinates.

Furthermore, another aspect of the present invention is a calibration method for an optical device provided with a two-dimensional image conversion element having a plurality of pixels, and an optical system that forms an image-formation relationship between the image conversion element and the three-dimensional world coordinate space. The calibration method includes: a step of acquiring calibration data representing the correspondence between two-dimensional pixel coordinates in the image conversion element and three-dimensional world coordinates in the world coordinate space; and a step of calculating parameters of a camera model by applying, to the acquired calibration data, a camera model that expresses two coordinate values of the three-dimensional world coordinates as functions of the other one coordinate value of the world coordinates and the two coordinate values of the two-dimensional pixel coordinates.

Furthermore, another aspect of the present invention is an optical device provided with a camera model in which the parameters calculated by the above-described calibration device are set.

Furthermore, in the above aspect, the camera model may be held as discrete data representing the correspondence between a plurality of pixel coordinates and world coordinates on two planes.

Furthermore, another aspect of the present invention is an optical device provided with a camera model in which the rotation angle and/or the translation component acquired by the above-described calibration device are set as parameters.

Furthermore, another aspect of the present invention is an image-acquisition device including the above-described optical device.

Furthermore, another aspect of the present invention is a projection device including the above-described optical device Furthermore, another aspect of the present invention is a measuring system including: the above-described calibration device; one or more above-described image-acquisition devices; and a three-dimensional-coordinate calculation processing unit that calculates the three-dimensional coordinates of points of interest on an object from pixel coordinates in images acquired by the image-acquisition device at a plurality of viewpoints. The three-dimensional-coordinate calculation processing unit uses the camera model used in the calibration device and the parameters of the camera model in the image-acquisition device, calculated by the calibration device.

Furthermore, another aspect of the present invention is a measuring system including: a first calibration device, serving as the above-described calibration device; a second calibration device, serving as the above-described calibration device; one or more above-described image-acquisition devices; one or more above-described projection devices; and a three-dimensional-coordinate calculation processing unit that calculates the three-dimensional coordinates of points of interest on an object from pixel coordinates in an image of the object acquired by the image-acquisition device, on which object structured light from the projection device is projected. The three-dimensional-coordinate calculation processing unit uses the camera models used in the first and the second calibration devices, the parameters of the camera model in the image-acquisition device calculated by the first calibration device, and the parameters of the camera model in the projection device calculated by the second calibration device.

Furthermore, another aspect of the present invention is a measuring method for calculating, by using the camera model used in the above-described calibration device, and the parameters of the camera model in one or more above-described image-acquisition devices, calculated by the calibration device, the three-dimensional coordinates of points of interest on an object from pixel coordinates in images acquired by the image-acquisition device at a plurality of viewpoints.

Furthermore, another aspect of the present invention is a measuring method for calculating, by using the camera models used in the first calibration device, serving as the above-described calibration device, and the second calibration device, serving as the above-described calibration device, the parameters of the camera model in one or more above-described image-acquisition devices, calculated by the first calibration device, and the parameters of the camera model in one or more above-described projection devices, calculated by the second calibration device, the three-dimensional coordinates of points of interest on an object from pixel coordinates in an image of the object acquired by the image-acquisition device, on which object structured light from the projection device is projected.

DESCRIPTION OF EMBODIMENTS

A calibration device and a camera calibration method according to a first embodiment of the present invention will be described below with reference to the drawings.

A calibration device according to this embodiment is a camera calibration device (first calibration device) 1 for calibrating a camera (image-acquisition device) 2 that transfers captured images to the outside as image files of certain formats. In this embodiment, the camera 2 is used as an example of an optical device.

Figure 1:
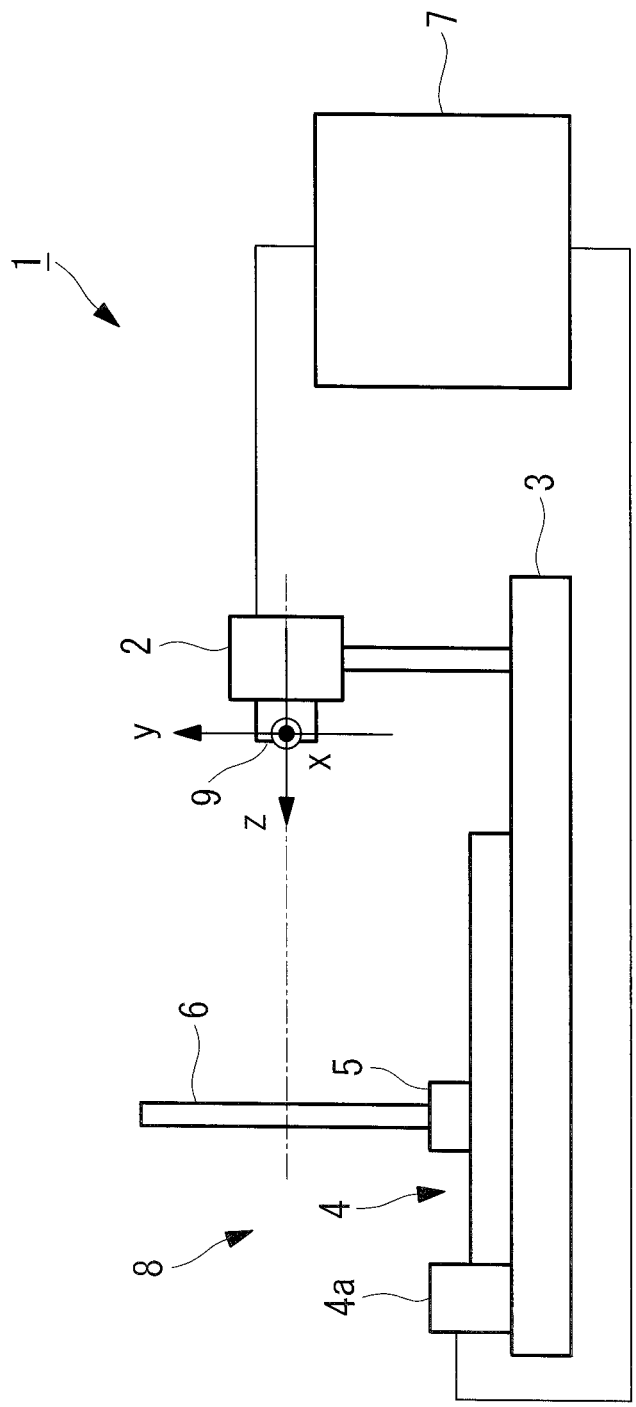
FIG. 1 is a diagram showing the overall configuration of a calibration device according to a first embodiment of the present invention.

As shown in FIG. 1, the camera calibration device 1 according to this embodiment includes: a base 3 to which the camera 2 to be calibrated is fixed; a z-axis moving stage 4 provided on the base 3; a calibration chart 6 fixed to a movable part 5 moved by the z-axis moving stage 4; and a computer 7 connected to the camera 2 and to the z-axis moving stage 4. The three-dimensional-coordinate axes of the camera calibration device 1 are defined as shown in FIG. 1. The base 3 to which the camera 2 is fixed, the calibration chart 6, and the z-axis moving stage 4 constitute a calibration-data acquisition unit 8.

The z-axis moving stage 4 is a linear driving mechanism that is driven by a motor 4a to linearly move the movable part 5. In the camera calibration device 1, the direction in which the movable part 5 is moved is defined as the z-axis, and the horizontal direction and the perpendicular direction in a plane perpendicular to the z-axis are defined as the x-axis and the y-axis.

Although the position of the coordinate origin may be arbitrary, it is defined as near the distal end of a camera lens 9 in this embodiment.

The camera 2 is mounted to the base 3 such that the optical axis thereof is parallel to the z-axis, such that the horizontal direction and the perpendicular direction of an image-acquisition surface are parallel to the x-axis and the y-axis, and such that the coordinate origin matches a certain position in the camera 2.

Figure 2:
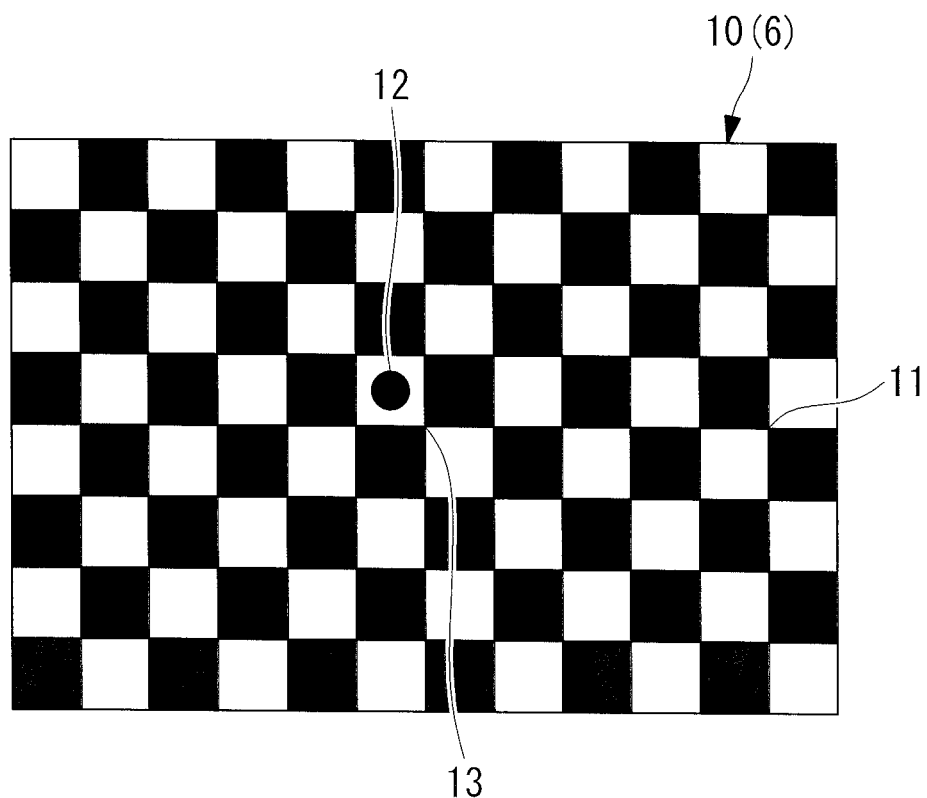
FIG. 2 is a diagram showing a pattern on a calibration chart of the calibration device in FIG. 1.

The calibration chart 6 is a chessboard 10 in FIG. 2, which is widely used in camera calibration, and is fixed to the movable part 5 so as to oppose, face-to-face, the camera 2 fixed to the base 3, that is, so as to be disposed in a plane perpendicular to the z-axis. The calibration chart 6 may be of any type, as long as it includes a plurality of feature points.

The calibration chart 6 can be moved by the z-axis moving stage 4 to an arbitrary position in the z-axis direction. The range in which the movable part 5 is moved by the z-axis moving stage 4 covers the range of the object distance (=the distance between the camera 2 and an image-acquisition target) for which camera calibration is necessary.

The computer 7 serves to control the image-acquisition operation of the camera 2 to read the captured images as image files of a certain format. Furthermore, the computer 7 serves to control the z-axis moving stage 4 to move the calibration chart 6 to a certain position in the z-axis direction. In addition, the computer 7 also serves as a parameter calculating unit that applies a camera model to acquired configuration data to calculate camera parameters.

Here, referring to FIG. 2, the chessboard 10 used as the calibration chart 6 will be described.

The chessboard 10 is a flat plate-like member having a checkered pattern in which black and white squares are arranged so as to form a square grid on a plane. Points of intersection, which correspond to the apexes of the squares, are used as feature points in camera calibration (hereinbelow, these feature points will be referred to as grid points 11).

As the chessboard 10, one in which a sufficient number of grid points 11 for camera calibration are in an image-acquisition area of the camera 2 is used. Although the area of the chessboard 10 to be image-captured varies with object distance, it is desirable that at least about 10×10 grid points 11 be image-captured at any object distance. Furthermore, to make the pixel coordinates of the image-captured grid points 11 correspond to the world coordinates of the grid points 11 on the calibration chart 6, a reference position mark 12 is provided near the center of the calibration chart 6.

The chessboard 10 is mounted on the camera calibration device 1 such that the grid point to the lower right of and closest to the reference position mark 12 (i.e., a grid point 13 at the center) is located on the z-axis, and, at the same time, such that the vertical direction and the horizontal direction of the chessboard 10 are parallel to the x-axis and the y-axis. As a result, based on the grid interval of the square grid of the chessboard 10 and the movement position of the z-axis moving stage 4, the world coordinates (x, y, z) of the grid points 11 and 13 are determined as known values.

A camera calibration method using the thus-configured camera calibration device 1 according to this embodiment will be described below.

When calibrating the camera 2 by using the camera calibration device 1 according to this embodiment, an operator first attaches the camera 2 to be calibrated to the camera calibration device 1 according to the definition of the coordinate axes and connects the camera 2 to the computer 7. Thereafter, a measurement program in the computer 7 is started.

Subsequently, by the operation of the measurement program, images of the calibration chart 6 are automatically captured by the camera 2 at a plurality of object distances, and, from these images, the pixel coordinates of the grid points 11 are acquired. The measurement program will be described with reference to the flowchart in FIG. 3.

When measurement is started, first, the z-axis moving stage 4 is moved such that the calibration chart 6 is located at an end, closer to the camera 2, of the object distance range for which the camera 2 is calibrated (step S1). Next, an image of the calibration chart 6 is captured by the camera 2, and the image file is transferred to the computer 7 (step S2). Steps S1 and S2 are repeated until a predetermined number of images have been captured (step S3). The predetermined number is, for example, at least five.

At this time, in step S1, each time the step is repeated, the z-axis moving stage 4 moves the movable part 5 such that the object distance between the camera 2 and the calibration chart 6 increases by a predetermined increment. Although the movable part 5 does not have to be moved by the same distance, it is desirable that the image of the calibration chart 6 be captured at, at least, about five different object distances within the object distance range for which the camera 2 is calibrated. Once the predetermined number of images have been captured, the process proceeds to the next step, step S4.

As a result of the plurality of image files transferred to the computer 7 in steps S1 to S3 being subjected to image processing, the pixel coordinates of the grid points 11 in the image-acquisition area are obtained, and the pixel coordinates of the center of gravity of the reference position mark 12 in each image file are obtained (step S4). Note that, because the method for obtaining the pixel coordinates of the grid points 11 in the chessboard 10 at the subpixel level is known from the following documents and the like, the description thereof will be omitted here: G. Bradski and A. Kaehler (translated by Koichi Matsuda), "Detailed Explanation of Open CV—Image Processing and Recognition Using Computer Vision Library" (O'REILY Japan, 2009) p. 325-326.

Next, the pixel coordinates of the grid points 11 obtained in step S4 are made to correspond to the world coordinates of the grid points 11 on the calibration chart 6 (step S5). As described above, because the grid point 13 at the center, which is to the lower right of and closest to the reference position mark 12, is located on the z-axis of the world coordinates, by using it as the reference, the pixel coordinates and the world coordinates of the grid points 11 and 13 can be made to correspond to each other. Finally, all the pixel coordinates and world coordinates that are made to correspond to each other are written into the measurement data file, thus completing the measurement. Through this procedure, the measurement data needed for camera parameter optimization can be obtained.

Figure 4A:
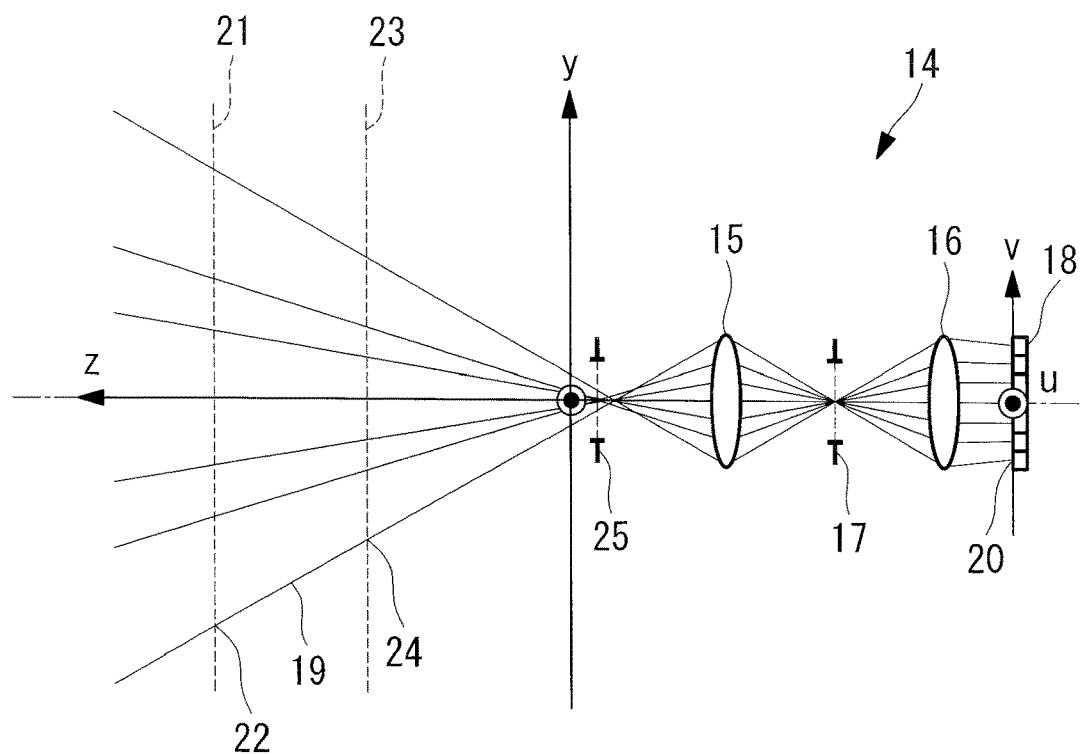
FIG. 4A is a diagram showing the relationship between world coordinates and pixel coordinates in the calibration device in FIG. 1.
Figure 4B:
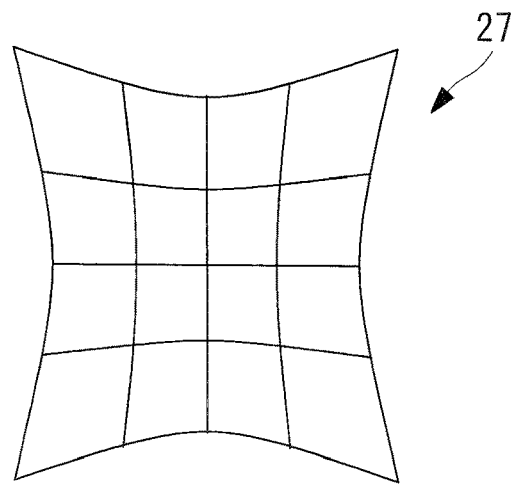
FIG. 4B is a diagram showing an example image with barrel distortion.
Figure 4C:
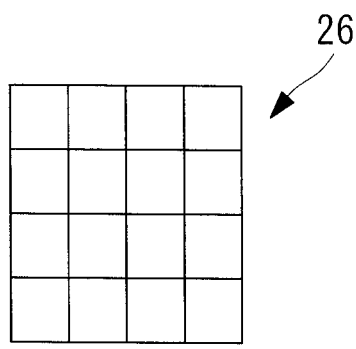
FIG. 4C is a diagram showing an example image without distortion.

Here, the camera model used in this embodiment will be described with reference to FIGS. 4A to 4C. FIG. 4A is a sectional view of the camera 2 for explaining the relationship between pixel coordinates in the camera 2 and object-side backprojection lines. The camera 2 includes: an image-acquisition optical system 14 including lenses 15 and 16 and an aperture stop 17; and an image-acquisition element (image conversion element).

The world coordinates (x, y, z) on the object side are defined in the same way as in FIG. 1. Furthermore, a u-axis and a v-axis in the pixel coordinate are defined on an image-acquisition surface of an image-acquisition element 18 so as to be parallel to the horizontal direction and the vertical direction of the image-acquisition element 18. In FIG. 4A, principal rays 19 incident on the centers of the pixels of the image-acquisition element 18 through the image-acquisition optical system 14 are illustrated.

The principal rays 19 are the rays that pass through the center of the aperture stop 17 of the image-acquisition optical system 14. Herein, the concept of the principal rays 19 will be described by taking as an example an image point 20, at which an image is formed at the center of one pixel, and the principal ray 19 corresponding thereto. First, assume a plane 21 conjugate with the image-acquisition surface of the image-acquisition element 18. An object point 22 located at the intersection point between the plane 21 and the principal ray 19 forms an image at the image point 20 through the image-acquisition optical system 14. In other words, if aberrations are ignored, all the rays passing through the object point 22 are incident on one point, i.e., the image point 20.

Next, assume an object point 24 shifted from the conjugate object point 22, along the principal ray 19, onto a plane 23 not conjugate with the image-acquisition surface. Because the rays passing through the non-conjugate object point 24 are not focused on one point, i.e., the image point 20, the image point on the image-acquisition surface is blurred and spread.

At this time, if coma is ignored, the blurred image spreads from the position of incidence of the principal ray 19 passing through the center of the aperture stop 17. Hence, if the center of gravity of the light intensity of the blurred image point is assumed to be the image position, the position of the image point 20 does not change. Thus, all the object points 22 and 24 on the object-side principal ray 19 form an image at one image point 20. In other words, the object-side principal ray 19 is a backprojection line of the image point 20.

Next, pupil aberration will be described. A virtual aperture, which is an image of the aperture stop 17 formed by the lens 15 located on the object side of the aperture stop 17, is an entrance pupil 25. Although the object-side principal rays pass through the center of the entrance pupil 25 and the vicinity thereof, unlike the case of the aperture stop 17, they do not intersect at one point at the center of the entrance pupil 25. This is because the aberrations of the lens 15 exist in the image-formation relationship between the aperture stop 17 and the entrance pupil 25. This is the pupil aberration.

Next, variation in distortion of the image-acquisition optical system 14 with object distance due to pupil aberration will be described. When image formation with the image-acquisition optical system 14 involves barrel distortion, image formation in the reverse direction, i.e., from the image side to the object side, involves pincushion distortion. More specifically, a square-grid pixel array 26 of the image-acquisition element 18, as shown in FIG. 4C, forms an image 27 distorted in a pincushion shape, as shown in FIG. 4B, on the conjugate plane 21 on the object side.

Here, assume a situation in which there is no pupil aberration, and all the object-side principal rays 19 intersect at one point at the center of the entrance pupil 25. At this time, the intersection points between the non-conjugate plane 23, which is parallel to the conjugate plane 21, and the principal rays corresponding to the pattern of the pixel array 26, as shown in FIG. 4C, form a pattern analogous to the image 27 on the conjugate plane 21, as shown in FIG. 4B. In other words, the shape of the distortion does not change with object distance. However, because the actual image-acquisition optical system 14 has pupil aberration, the shape of the distortion changes with object distance.

The camera model of the present invention, which is formed so as to conform to this situation, will be described. First, the image-formation relationship between the pixel coordinates (u, v) of the image point 20 on the image-acquisition element 18 and the world coordinates (x1, y1, z1) of the object point 22 on the conjugate plane 21 is expressed by an image-formation expression, including distortion. In this embodiment, the image-formation expression in Expression 6 is defined on the basis of Brown's model in Expression 5.

$$\begin{pmatrix} x_1 \\ y_1 \end{pmatrix} = k_0 \begin{pmatrix} u \\ v \end{pmatrix} + k_1 r^2 \begin{pmatrix} u \\ v \end{pmatrix} + \\ p_1 \begin{pmatrix} r^2 + 2u^2 \\ 2uv \end{pmatrix} + p_2 \begin{pmatrix} 2uv \\ r^2 + 2v^2 \end{pmatrix} + \begin{pmatrix} \Delta u \\ \Delta v \end{pmatrix}$$ {Expression 6} where $r^2 = u^2 + v^2$

The image-formation expression differs from Brown's model in that: (1) a term including coefficient k0 representing the lateral magnification from the pixel coordinate to the world coordinate is added; (2) third-order radial distortion k1 and second-order tangential distortion (p1, p2) alone are taken into consideration; and (3) lateral movement ($\Delta u$, $\Delta v$) of the pixel coordinates with respect to the world coordinates is added.

The image-formation relationship with respect to the world coordinates (x2, y2, z2) of the object point 24 on the non-conjugate plane 23 are also expressed by an image-formation expression similar to Expression 6. Note that, because the lateral magnification and distortion change with object distance, the coefficients change. Hence, as shown in Expression 7, a prime is added to each of the coefficients in the image-formation expression.

$$\begin{pmatrix} x_2 \\ y_2 \end{pmatrix} = k_0' \begin{pmatrix} u \\ v \end{pmatrix} + k_1' r^2 \begin{pmatrix} u \\ v \end{pmatrix} + \\ p_1' \begin{pmatrix} r^2 + 2u^2 \\ 2uv \end{pmatrix} + p_2' \begin{pmatrix} 2uv \\ r^2 + 2v^2 \end{pmatrix} + \begin{pmatrix} \Delta u' \\ \Delta v' \end{pmatrix}$$ {Expression 7}

Meanwhile, because the object-side principal ray 19 is linear, from the slope (a, c) and the intercept (b, d) in the x-direction and the y-direction, it is expressed as Expression 8.

$$\begin{pmatrix} x \\ y \end{pmatrix} = \begin{pmatrix} a \\ c \end{pmatrix} z + \begin{pmatrix} b \\ d \end{pmatrix}$$ {Expression 8}

Because the object point 22 and the object point 24 are on the common principal ray 19, Expression 9 and Expression 10 are established.

$$\begin{pmatrix} x_1 \\ y_1 \end{pmatrix} = \begin{pmatrix} a \\ c \end{pmatrix} z_1 + \begin{pmatrix} b \\ d \end{pmatrix}$$ {Expression 9}

$$\begin{pmatrix} x_2 \\ y_2 \end{pmatrix} = \begin{pmatrix} a \\ c \end{pmatrix} z_2 + \begin{pmatrix} b \\ d \end{pmatrix}$$ {Expression 10}

Herein, the coefficients (a, b, c, d) are functions of the pixel coordinates (u, v), and, in Expression 9 and Expression 10, the coefficients (a, b, c, d) are common. Here, because the left-hand sides of Expression 6 and Expression 9 and the left-hand sides of Expression 7 and Expression 10 are common to each other, the right-hand sides thereof are equal; that is, simultaneous equations are established. By solving them, the coefficients (a, b, c, d) are obtained.

$$\begin{pmatrix} a \\ c \end{pmatrix} = k_{A0} \begin{pmatrix} u \\ v \end{pmatrix} + k_{A1} r^2 \begin{pmatrix} u \\ v \end{pmatrix} + \\ p_{A1} \begin{pmatrix} r^2 + 2u^2 \\ 2uv \end{pmatrix} + p_{A2} \begin{pmatrix} 2uv \\ r^2 + 2v^2 \end{pmatrix} + \begin{pmatrix} \Delta u_A \\ \Delta v_A \end{pmatrix}$$ {Expression 11}

$$\begin{pmatrix} b \\ d \end{pmatrix} = k_{B0} \begin{pmatrix} u \\ v \end{pmatrix} + k_{B1} r^2 \begin{pmatrix} u \\ v \end{pmatrix} + \\ p_{B1} \begin{pmatrix} r^2 + 2u^2 \\ 2uv \end{pmatrix} + p_{B2} \begin{pmatrix} 2uv \\ r^2 + 2v^2 \end{pmatrix} + \begin{pmatrix} \Delta u_B \\ \Delta v_B \end{pmatrix}$$ {Expression 12}

Note that the coefficients kA0 and kB0 in Expression 11 and Expression 12 and the coefficients k0 and k'0 in Expression 6 and Expression 7 are in the relationship expressed by Expression 13.

$$k_{A0} = \frac{k_0' - k_0}{z_2 - z_1}, \; k_{B0} = \frac{k_0 z_2 - k_0' z_1}{z_2 - z_1}$$ {Expression 13}

This also applies to the relationship between other coefficients in Expression 11 and Expression 12 and other coefficients in Expression 6 and Expression 7. By substituting Expression 11 and Expression 12 into Expression 8, the camera model according to this embodiment, represented by Expression 14, is obtained.

$$\begin{pmatrix} x \\ y \end{pmatrix} = (k_{A0} z + k_{B0}) \begin{pmatrix} u \\ v \end{pmatrix} + \\ (k_{A1} z + k_{B1}) r^2 \begin{pmatrix} u \\ v \end{pmatrix} + (p_{A1} z + p_{B1}) \begin{pmatrix} r^2 + 2u^2 \\ 2uv \end{pmatrix} + \\ (p_{A2} z + p_{B2}) \begin{pmatrix} 2uv \\ r^2 + 2v^2 \end{pmatrix} + \begin{pmatrix} \Delta u_A z + \Delta u_B \\ \Delta v_A z + \Delta v_B \end{pmatrix}$$ {Expression 14}

As has been described above, the camera model represented by Expression 14 and used in the camera calibration device 1 according to this embodiment is obtained by directly modeling the object-side backprojection lines corresponding to pixel coordinates. It is constructed on the basis of the linear model in Expression 6, representing the image-formation relationship between world coordinates and pixel coordinates, including distortion. It is characterized in that each of the coefficients in the linear model of Expression 6 representing the image-formation relationship is replaced with a linear equation of z so that the lateral magnification and the distortion that change with object distance can be expressed.

The coefficients in Expression 14 with subscript A represent the slopes of the backprojection lines with respect to the z-axis, whereas the coefficients with subscript B (remaining when z=0) represent the intersection points between the backprojection lines and the z=0 plane, that is, the intercepts.

The camera model used in the camera calibration device 1 according to this embodiment is also characterized in that object coordinate vectors (x, y) are represented by a linear sum of linearly independent two-dimensional basic function vectors consisting of variables (u, v; z). Because it is a linear sum of basic function vectors, the coefficients of the model representing the x-coordinate and the y-coordinate are common to each other. Therefore, the coefficients of each of the basic function vectors can be obtained from all the measurement data by using a linear least-squares method. A description thereof will be given below.

Figure 3:
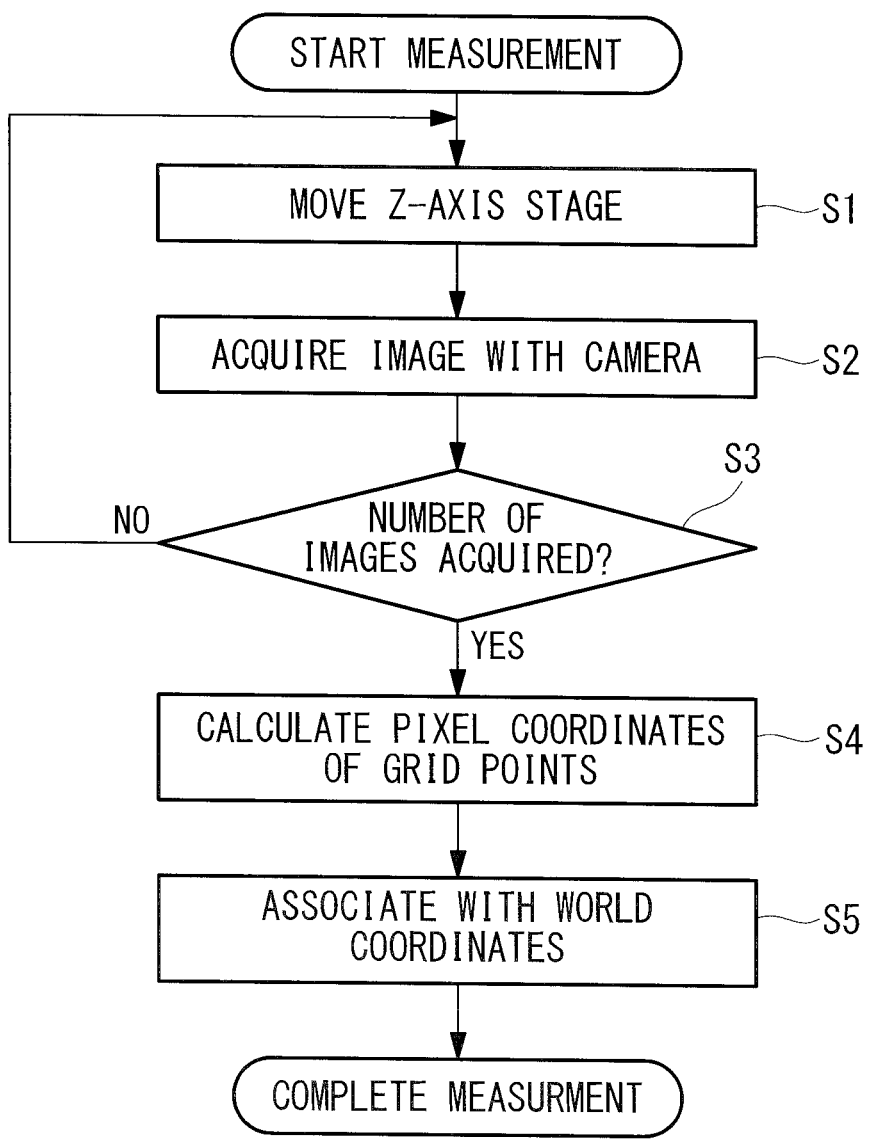
FIG. 3 is a flowchart showing a calibration method according to the first embodiment of the present invention.

First, in the measurement program shown in FIG. 3, measurement data representing the correspondence between the world coordinates (x, y, z) and the pixel coordinates (u, v) are obtained. Next, the camera model expressed in Expression 14, with independent variables (u, v; z) and dependent variables (x, y), is applied to measurement data of all the grid points by a linear least-squares method to obtain the coefficients (camera parameters) in the camera model of Expression 14. Thus, the camera calibration according to this embodiment is completed.

The camera model in which the camera parameters obtained according to this embodiment are set can be used in an image-acquisition device including the camera 2 that is provided with this camera model, as follows. Note that the image-acquisition device further includes: a world-coordinate calculating unit (not shown) that calculates two coordinate values of three-dimensional world coordinates; a straight-line calculating unit (not shown) that calculates a straight line corresponding to pixel coordinates in a world coordinate space; and a distortion-corrected image generating unit (not shown) that generates an image in which distortion is corrected.

Firstly, when an object distance z is known, the world-coordinate calculating unit substitutes pixel coordinates (u, v) of interest in an image captured by the calibrated camera 2 and the object distance z into the camera model of Expression 14. As a result, the world coordinates (x, y) of the above-described feature point can be obtained. Secondly, when a backprojection line in the world coordinates is to be obtained, the straight-line calculating unit substitutes the pixel coordinates (u, v) of interest into Expression 11 and Expression 12. As a result, the slope and intercept of the backprojection line can be obtained.

Thirdly, the distortion of the image captured by the calibrated camera 2 can be corrected by the distortion-corrected image generating unit. The method therefor will be described. An image of an object represented by world coordinates is distorted when captured by the camera 2. Thus, by projecting the obtained image into the world coordinates by using the above-described camera model, the distortion can be corrected. When an image of an object on a plane at a known object distance z is captured, by substituting the pixel coordinates (u, v) and the object distance z into the camera model of Expression 14, the pixel coordinates (u, v) can be projected on the world coordinates (x, y).

Meanwhile, when an image of an object not on such a plane is captured, a distortion-correction reference object distance is defined, and the image is projected on the world coordinates (x, y) at that object distance z. When the variation in distortion with object distance is small, this distortion correction suffices. However, when projected on the world coordinates, the image expands or contracts. Hence, the projected world coordinates are normalized by the lateral magnification (kA0z+kB0) in the camera model of Expression 14. By doing so, a distortion-corrected image having substantially the same size as the original image can be obtained.

Formation of a distortion-corrected image is a series of procedures in which the pixel values of the original image corresponding to the pixel coordinates (integers) of the image after distortion correction are substituted into the pixel coordinates after distortion correction. The procedures will be described with reference to the flowchart in FIG. 5. When distortion correction is started, first pixel coordinates (uc, vc) after distortion correction are determined (step S11).

Next, initial values (0, 0) are given to the pixel coordinates (u, v) before distortion correction (step S12). Note that, when the pixel coordinates (u, v) before distortion correction corresponding to the pixel coordinates (uc, vc) after distortion correction can be estimated by some method, they may be used as the initial values.

The pixel coordinates (u, v) before distortion correction and the distortion-correction reference object distance z are substituted into the camera model of Expression 14 to obtain world coordinates (x, y) (step S13). Then, the obtained world coordinates (x, y) are normalized by the lateral magnification (kA0z+kB0) to obtain pixel coordinates (u', v') (step S14).

The distance between the obtained pixel coordinates (u', v') and the pixel coordinates (uc, vc) after distortion correction is obtained (step S15). When the obtained distance is smaller than a predetermined value, the process proceeds to step S18. In other cases, the process returns to step S13 via step S17, in which the pixel coordinates (u, v) before distortion correction are updated (step S16).

Steps S13 to S17, which are repeated optimization steps, can be performed by a typical algorithm, such as a downhill simplex method. The method for updating the pixel coordinates (u, v) follows that algorithm.

The pixel coordinates (u, v) before distortion correction when the repeated optimization has converged correspond to the pixel coordinates (uc, vc) after distortion correction via the camera model of Expression 14. Typically, these pixel coordinates (u, v) are nonintegers. Hence, the pixel values of the pixel coordinates (u, v) are obtained from the pixel values of the four pixels adjacent to those pixel coordinates by bilinear interpolation. Then, the obtained pixel values are used as the pixel values of the pixel coordinates (uc, vc) after distortion correction (step S18). Note that, for interpolation of pixel values, another method, such as bicubic interpolation, may be employed. The above-described steps S11 to S18 are repeated with respect to all the pixel coordinates (uc, vc) after distortion correction (step S19), and then, distortion correction is completed.

In the above-described first to third camera-model usage examples, the world coordinates corresponding to the pixel coordinates are calculated each time by using the camera model of Expression 14. Meanwhile, by preliminarily calculating them and storing them as data arrays, the speed of calculation can be increased.

For example, in the second usage example, the slopes and intercepts of backprojection lines corresponding to the respective pixel coordinates are preliminarily calculated as data arrays. Alternatively, the intersection points between planes at two object distances and backprojection lines corresponding to the respective pixel coordinates are preliminarily calculated as data arrays. Then, by interpolating these data arrays, the backprojection line of the pixel of interest is obtained. This also applies to another usage examples.

In this embodiment, camera calibration is performed by using the measurement data of the grid points 11 and 13 arranged in a square-grid pattern on the planar chessboard 10. However, the feature points on the calibration chart 6 may be patterns other than the grid points 11 and 13.

For example, it is possible to employ a measurement-data forming method in which an image of dot marks distributed over a plane is captured, and the position of the center of gravity thereof is used as the pixel coordinates. Moreover, the feature points used in camera calibration of the present invention do not have to be regularly arrayed in the world coordinate space. Even when the feature points are randomly arranged, if it is possible to know the correspondence between the world coordinates and the pixel coordinates thereof by measurement, simulation, or other methods, the camera model of the present invention can be applied thereto by a linear least-squares method.

As has been described, it is only required for the measurement data of the camera calibration according to this embodiment that the correspondence between the world coordinates and the pixel coordinates is clear. Such measurement data may be acquired by, for example, the following method. First, a point light source that can be moved in the x-, y-, and z-axis directions is prepared on the world coordinate side. Then, the point light source is moved in the x-, y-, and z-axis directions such that the image of the point light source is positioned at the pixel coordinates of interest in an image captured by the camera 2. By repeating such measurement, the correspondence between the world coordinates and the pixel coordinates can be obtained.

In this embodiment, the camera model of Expression 14, in which third-order radial distortion and second-order tangential distortion alone are taken into consideration, is employed. However, when a camera 2 having greater distortion is to be calibrated, a camera model in which terms of even higher order distortions and rotationally asymmetrical distortions are added may also be employed. In that case, a linear model, such as the image-formation expression in Expression 6 representing the image-formation relationship between the image-acquisition surface of the image-acquisition element 18 and the plane 21 conjugate therewith, is prepared.

Then, by replacing the coefficients of the linear model with a linear equation of the object distance z, as in the camera model of Expression 14, a new camera model can be constructed. The optimization method for obtaining the coefficients is the same as that in this embodiment.

Conversely, it is possible to omit unnecessary terms from the camera model. For example, when calibrating a camera 2 that is so small that a rotationally asymmetrical distortion component can always be ignored, it is desirable that the tangential distortion term in the camera model of Expression 14 be omitted. By doing so, it is possible to prevent the camera model from being irrelevantly deformed and becoming inaccurate due to a measurement error of the grid points 11. This also applies to other terms.

In this embodiment, the camera model of Expression 14 is obtained by being applied to the measurement data of all the grid points 11 and 13 representing the correspondence between the world coordinates (x, y, z) and the pixel coordinates (u, v) by a linear least-squares method. Meanwhile, the camera model according to this embodiment can be obtained by other methods. The two methods below are particularly effective when a camera model is formed by obtaining, by simulation, the image-formation relationship of the feature points by the camera 2.

In the first method, data about feature points on two planes in the world coordinates and the pixel coordinates corresponding thereto is used. First, the image-formation expression in Expression 6 is applied, by a linear least-squares method, to the data representing the correspondence between the world coordinates of a plurality of feature points on a first plane and the pixel coordinates. Next, the image-formation expression in Expression 7 is applied in the same way to the feature points on a second plane. From their coefficients, by means of Expression 13, the coefficients in the camera model of Expression 14 can be obtained.

In the second method, models of the slope and intercept of a backprojection line are independently calculated. By setting one of the above-described two planes to be the z=0 plane in the world coordinates and by obtaining the intersection points with respect to the principal rays traced from a plurality of pixel coordinates, data on the intercept of the backprojection line can be obtained. By applying Expression 12 to it, the coefficients of the intercept, with subscript B, in the camera model according to this embodiment can be obtained.

In addition, by obtaining the intersection point between the other plane and the principal rays traced from the same plurality of pixel coordinates, the data on the slopes of the backprojection lines corresponding to the respective pixel coordinates can be obtained. By applying Expression 11 to it, the coefficients of the slope, with subscript A, in the camera model according to this embodiment can be obtained. The coefficients in the camera model of Expression 14 may be obtained in this way.

In this way, according to the camera calibration device 1 and the camera calibration method according to this embodiment, the pupil aberration of the image-acquisition optical system 14 can be accurately modeled by the camera model according to this embodiment. In addition, the rotationally asymmetrical distortion and the pupil aberration can also be modeled. As a result, it is possible to accurately express the distortion that varies with object distance and a group of backprojection lines reflecting it, thus improving the precision of the camera model.

Furthermore, because the camera model used in the camera calibration device 1 and in the camera calibration method according to this embodiment is a linear model, it can be applied to the measurement data by a linear least-squares method. Hence, unlike conventional models that employ repeated optimization, the optimization does not fail, and the calculation time can be significantly reduced.

Furthermore, the feature points used in the camera calibration device 1 and the camera calibration method according to this embodiment do not have to be regularly arrayed. Hence, provided that the correspondence between the world coordinates and the pixel coordinates can be made clear, it is possible to select any acquisition method, either by measurement or calculation, suitable for the camera 2 to be calibrated.

Next, a camera calibration method according to a second embodiment of the present invention will be described below with reference to the drawings. In the first embodiment, as shown in FIG. 1, a camera calibration method in which the optical axis of the camera 2 to be calibrated is parallel to the z-axis of the camera calibration device 1 and in which the horizontal direction and the perpendicular direction of the image-acquisition surface are parallel to the x-axis and the y-axis has been described. In this embodiment, a camera calibration method when such conditions are not satisfied will be described.

There are, in total, six degrees of freedom in the position and orientation of the camera 2 with respect to the world coordinates, which are the three-axis rotation matrix R and the translation vector T in Expression 2. Among them, the translation in the x-, y-, and z-axis directions can be expressed by the terms including the coefficients $\Delta uB$, $\Delta vB$, and the respective coefficients with subscript B, which show the intercept, in the camera model of Expression 14.

Figure 6A:
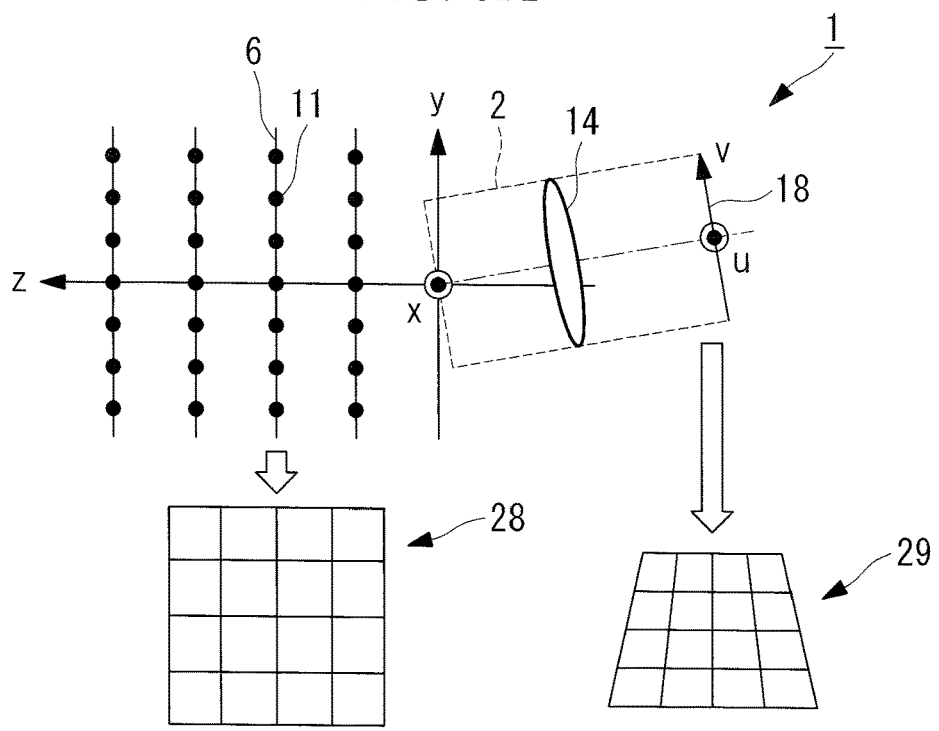
FIG. 6A is a diagram showing a case where the optical axis of a camera is inclined with respect to the z-axis of the calibration device in FIG. 1.

The remaining three degrees of freedom, that is, the rotation about the x-, y-, and z-axes cannot be expressed by the camera model of Expression 14. This will be described with reference to FIGS. 6A and 6B. FIG. 6A is a schematic view of the camera calibration device 1 in FIG. 1, as viewed from the side. The camera 2 is attached so as to be rotated about the x-axis of the world coordinates defined in the camera calibration device 1. Thus, the optical axis of the image-acquisition optical system 14 is not parallel to the z-axis of the world coordinates.

FIG. 6A also illustrates the calibration chart 6 moved to positions at a plurality of object distances and the grid points 11 therein. At this time, a grid array 28 of the grid points 11 arrayed in the form of a square grid forms an image in the form of an image 29, which has trapezoidal distortion, on the image-acquisition surface of the image-acquisition element 18.

It is generally known that minor trapezoidal distortion is absorbed by the tangential distortion term in the camera model of Expression 14. However, as the rotation angles about the x- and y-axes increase, and the consequent trapezoidal distortion increases, the deviation from the camera model of Expression 14 becomes significant.

As a result, the residual error when the camera model of Expression 14 is applied to the measurement data of the world coordinates of the grid points 11 and the pixel coordinates increases, making the obtained camera model inaccurate. A countermeasure therefor will be described by using FIG. 6B.

Figure 6B:
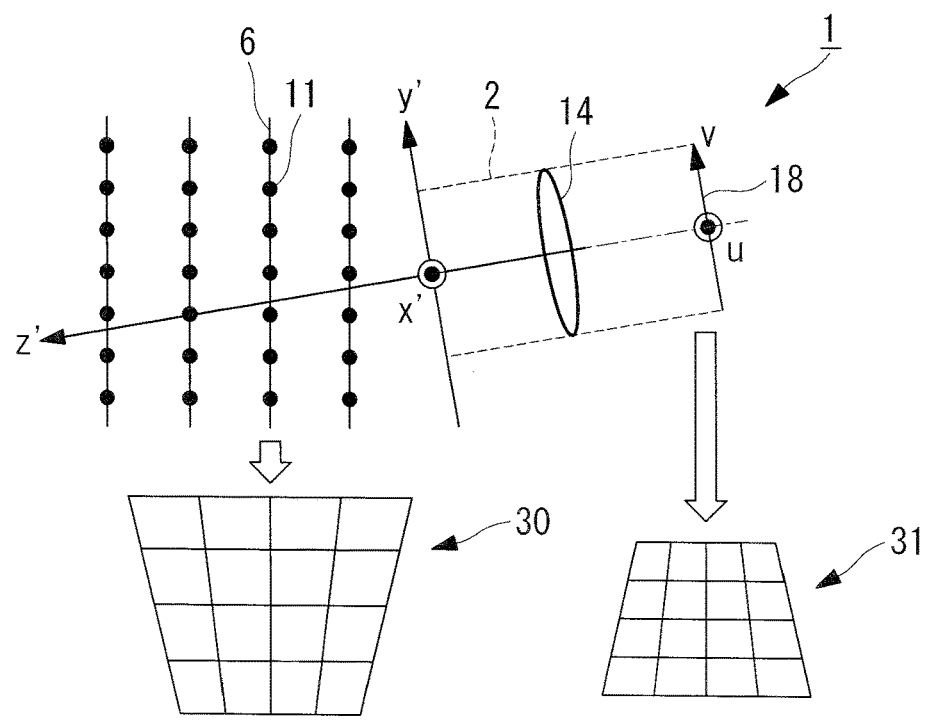
FIG. 6B is a diagram for explaining a calibration method according to a second embodiment of the present invention.

FIG. 6B shows a state in which the coordinate axes of the world coordinates are rotated about the x-axis, and the z'-axis after rotation is parallel to the optical axis of the image-acquisition optical system 14. At this time, the grid points 11 become a trapezoidal grid array 30, as viewed in the z'-axis direction after rotation. Thus, the relationship between the world coordinates (x', y', z') of the grid points 11, converted into the coordinate values in the world coordinates after rotation, and the pixel coordinates (u, v) at which the grid points 11 form an image is, if distortion is ignored, an analogous image-formation relationship from the trapezoidal grid 30 to the trapezoidal grid 31. As a result, the camera model of Expression 14 becomes suitably applicable.

The conversion from the world coordinates (x, y, z) of the grid points 11 before rotation to the world coordinates (x', y', z') after rotation is expressed as Expression 15, by the rotation matrix of the rotation angles $\theta x$, $\theta y$, and $\theta z$ about the x-, y-, and z-axes.

$$\begin{pmatrix} x' \\ y' \\ z' \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x \\ y \\ z \end{pmatrix}$$ {Expression 15}

Thus, in the second embodiment, only the world coordinates of the measurement data representing the correspondence between the world coordinates (x, y, z) of the plurality of grid points 11 and the pixel coordinates (u, v) measured in the arrangement in FIG. 6A are converted into (x', y', z') by means of Expression 15, and then, the camera model of Expression 14 is applied thereto.

Then, the rotation angles $\theta x$, $\theta y$, and $\theta z$ are optimized so as to minimize the residual error. Typically, the residual error of the camera model of Expression 14 becomes minimum when the optical axis of the image-acquisition optical system 14 and the z'-axis after rotation are parallel, and in addition, when the horizontal direction and the perpendicular direction of the image-acquisition surface are parallel to the x-axis and the y-axis, as in FIG. 6B.

Next, a procedure for optimizing the camera model with the camera calibration method according to the second embodiment will be described. First, in the same way as in the first embodiment, the measurement data representing the correspondence between the world coordinates (x, y, z) and the pixel coordinates (u, v) is obtained.

Next, the rotation angles $\theta x$, $\theta y$, and $\theta z$, serving as the optimization parameters, are repeatedly optimized by using, as an evaluation function, the standard deviation of the residual error when the camera model of Expression 14 is applied to the pixel coordinates (u, v) of the measurement data and the world coordinates (x', y', z') after rotation by a linear least-squares method. The initial values of the rotation angles $\theta x$, $\theta y$, and $\theta z$ may be zero. Alternatively, when the rotation angles of the camera 2 can be estimated by some method, they may be used as the initial values.

This repeated optimization can be performed by a typical algorithm, such as a downhill simplex method. The rotation angles $\theta x$, $\theta y$, and $\theta z$ when the evaluation function converges to a minimum value are the optimum rotation angles. By acquiring the optimum rotation angles and the respective coefficients of the camera model at these rotation angles, the camera calibration is completed.

The camera model in which the camera parameters obtained by the camera calibration method according to this embodiment are set can be used, as in the first embodiment, in an image-acquisition device including the camera 2 that is provided with this camera model. Note that the world coordinates that are obtained, by means of the camera model of Expression 14, from the pixel coordinates of interest are the world coordinates (x', y', z') after rotation. Depending on the purpose, the world coordinates or the backprojection line before rotation corresponding to the pixel coordinates of interest may be needed. In that case, the image-acquisition device including the camera 2 has a world-coordinate rotating unit (not shown), which converts the world coordinates (x', y', z') after rotation into the world coordinates (x, y, z) before rotation.

This can be achieved by, for example, the following procedure. First, world coordinates (x1', y1') and (x2', y2') at two arbitrary object distances z1' and z2' after rotation corresponding to pixel coordinates are obtained by means of the camera model of Expression 14. Next, the world-coordinate rotating unit converts the two world coordinates (x1', y1', z1') and (x2', y2', z2') into world coordinates (x1, y1, z1) and (x2, y2, z2) before rotation through inverse conversion of Expression 15 with the optimum rotation angles $\theta x$, $\theta y$, and $\theta z$.

The straight line passing through the two points obtained by the conversion is the backprojection line of the world coordinates before rotation. By substituting the object distance z before rotation into this backprojection line, the world coordinates (x, y) before rotation corresponding to the pixel coordinates can be obtained.

In this embodiment, three rotation angles $\theta x$, $\theta y$, and $\theta z$ are optimized. However, when some of these rotation angles are known, they may be fixed by the known values and excluded from the optimization parameters. In that case, only the remaining one or a plurality of unknown rotation angles may be optimized. By doing so, the number of optimization parameters is reduced, and thus, the calculation time can be reduced.

Note that the three rotation angles of the three-dimensional coordinates may be arbitrarily defined. In this embodiment, the description has been given by employing the definition that they are the rotation angles about the x-, y-, and z-axes. However, the present invention can of course be applied when other definitions are employed.

In this way, according to the camera calibration method according to this embodiment, a precise camera model can be acquired even when the position and orientation of the camera 2 with respect to the world coordinates are not appropriately aligned. Furthermore, when a large number of camera parameters, such as distortion, are needed, because the number of parameters for repeated optimization is limited to three or fewer rotation angles, the optimization of the camera model does not fail, and the calculation time can be significantly reduced.

Next, a camera calibration device 32 and a camera calibration method according to a third embodiment of the present invention will be described below with reference to the drawings. The camera calibration device 32 according to this embodiment is used to calibrate multi-viewpoint cameras 33, 34, and 35 for three-dimensional shape restoration. Although an example case of calibrating a multi-viewpoint camera including three cameras will be described below, this method can also be applied to the calibration of a multi-viewpoint camera including more or less than three cameras.

Figure 7:
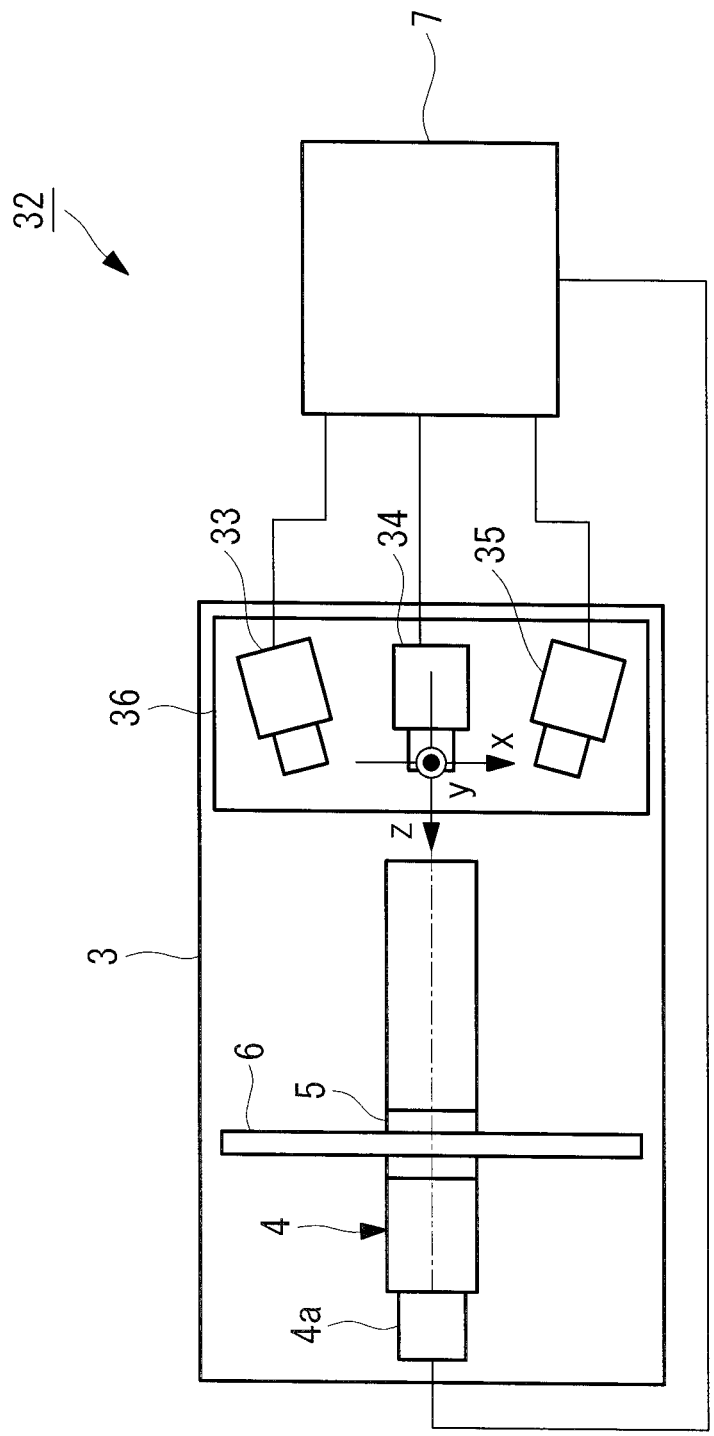
FIG. 7 is a schematic plan view of a calibration device according to a third embodiment of the present invention.

In the camera calibration device 32 according to this embodiment, as shown in FIG. 7, the three cameras 33, 34, and 35 to be calibrated are fixed to a camera fixing base 36 with the same arrangement as in the use condition of the multi-viewpoint cameras. The camera fixing base 36 is attached to the camera calibration device 32 such that each of the cameras 33, 34, and 35 can acquire an image of the calibration chart 6. The configurations of the other components, such as the calibration chart 6, the z-axis moving stage 4, and the computer 7, are the same as those in FIG. 1, and hence, descriptions thereof will be omitted.

The advantage of the thus-configured camera calibration device 32 according to this embodiment will be described below. The operation of the camera calibration device 32 according to this embodiment is the same as the camera calibration device 1 according to the first embodiment. First, the measurement program shown in the flowchart in FIG. 3 causes the cameras 33, 34, and 35 to automatically acquire images of the calibration chart 6 at a plurality of object distances, and the pixel coordinates of the grid points 11 in the calibration chart 6 are acquired from these images. Note that steps S2, S4, and S5 in the flowchart in FIG. 3 are performed for each of the three cameras.

Next, camera models of the cameras 33, 34, and 35 are obtained from the measurement data of the cameras 33, 34, and 35. The procedure therefor is the same as that in the first embodiment when the optical axes of the cameras 33, 34, and 35 are substantially parallel to the z-axis of the camera calibration device 32, and in addition, when the horizontal direction and the perpendicular direction of the image-acquisition surface are parallel to the x-axis and the y-axis. In other cases, as in the second embodiment, the optimum rotation angles $\theta x$, $\theta y$, and $\theta z$ are also optimized.

The camera models in which the camera parameters obtained with the camera calibration device 32 according to this embodiment are set can be used in an image-acquisition device including the cameras 33, 34, and 35 provided with these camera models, as in the first and second embodiments. In particular, when it is intended to handle the world coordinates or the backprojection lines corresponding to the pixel coordinates in the cameras 33, 34, and 35 in one common world coordinate space, the procedure for obtaining the world coordinates or the backprojection lines before rotation, described in the second embodiment, may be used.

Note that it is unnecessary to measure the measurement data of the multi-viewpoint cameras 33, 34, and 35 at the same time. For example, the measurement program shown in the flowchart in FIG. 3 may be independently and sequentially performed on each of the cameras. Furthermore, when the measurement data of the cameras 33, 34, and 35 are obtained, the placement position of the z-axis moving stage 4 may be changed on the camera calibration device 32 such that the calibration chart 6 opposes, face-to-face, each of the cameras to be measured.

Note that it is necessary to grasp the amount of change in the placement position and to form measurement data in which the amount of change in the placement position is reflected in the world coordinates of the grid points 11 in the calibration chart 6. This camera calibration method is effective when there is a camera that cannot acquire an image of the calibration chart 6 that is fixed in one direction because the multi-viewpoint cameras 33, 34, and 35 are arranged so as to surround an observation area.

In this way, according to the camera calibration device 32 and the camera calibration method according to this embodiment, the multi-viewpoint cameras 33, 34, and 35 can be calibrated in the same arrangement as in the use condition. Furthermore, there is an advantage in that it is possible to handle the world coordinates or the backprojection lines corresponding to the pixel coordinates in the cameras 33, 34, and 35 in one common world coordinate space.

Next, a measuring system and a measuring method according to an embodiment of the present invention will be described below with reference to the drawings.

As shown in FIG. 7, the measuring system according to this embodiment includes the camera calibration device 32 according to the third embodiment, the multi-viewpoint cameras 33, 34, and 35, and a three-dimensional-coordinate calculation processing unit (computer 7).

By performing camera calibration using the camera calibration device 32, camera models in which the camera parameters of the multi-viewpoint cameras 33, 34, and 35 are set can be obtained from Expression 14.

Figure 9:
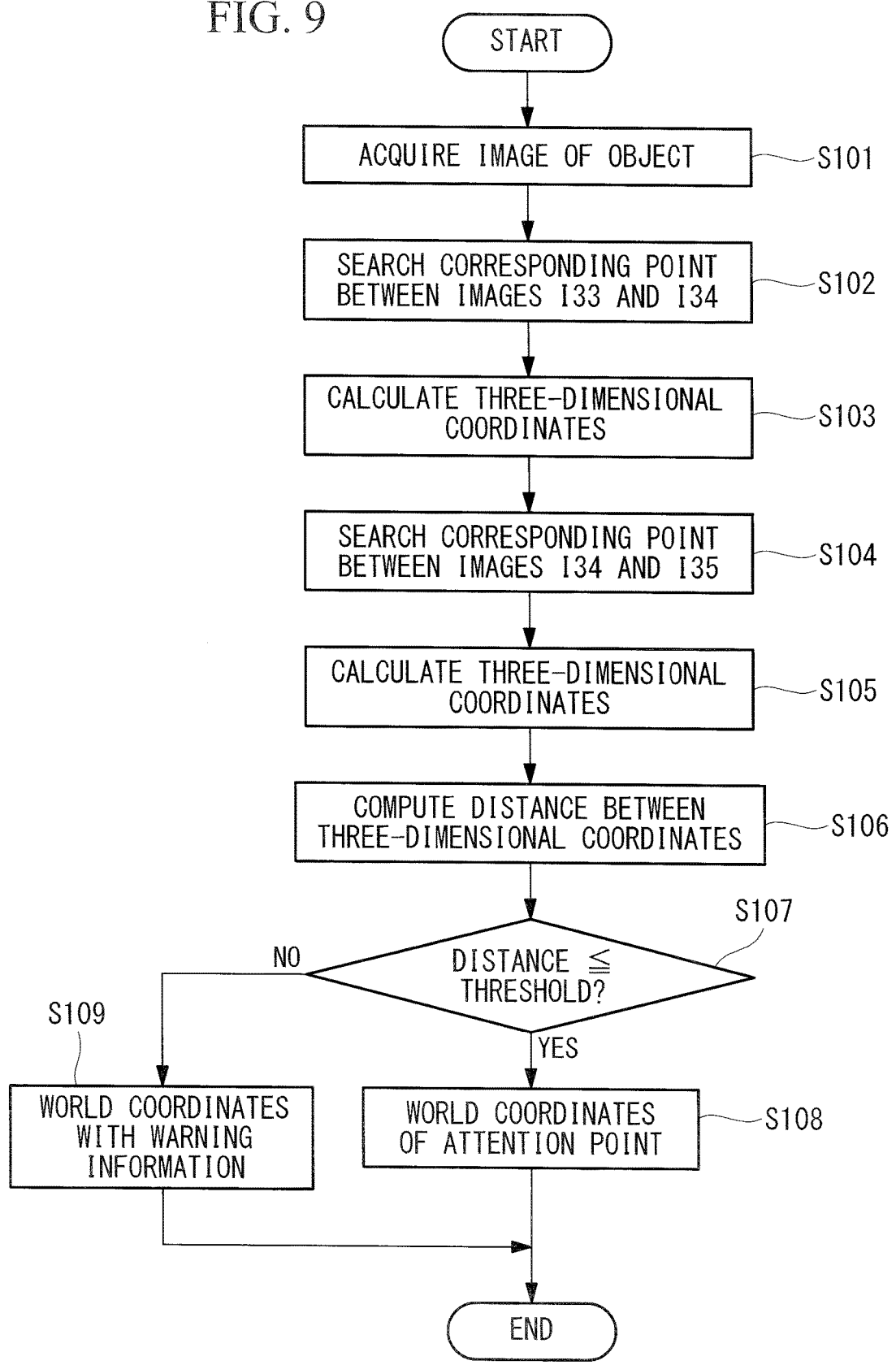
FIG. 9 is a flowchart showing a measuring method according to an embodiment of the present invention.

The three-dimensional-coordinate calculation processing unit built in the computer 7 calculates, through calculation processing including the steps described below, the world coordinates of points of interest on the surface of an object images of which have been acquired by the multi-viewpoint cameras 33, 34, and 35. When the optical axes of the multi-viewpoint cameras 33, 34, and 35 are assumed to be parallel, the process proceeds as shown in FIG. 9.

In Step S101, three object images I33, I34, and I35 acquired by the multi-viewpoint cameras 33, 34, and 35 are read.

In step S102, the pixel coordinates of the pixel in the image I33 corresponding to the pixel coordinates of each pixel in the image I34 specified by a user are obtained through corresponding-point searching processing.

In step S103, simultaneous equations of: an equation wherein the pixel coordinates specified in I34 and the camera parameters of the camera 34 are substituted into Expression 14; and an equation wherein the coordinates of the corresponding pixels in I33, obtained in step S102, and the camera parameters of the camera 33 are substituted into Expression 14 are solved to obtain world coordinates A of the point of interest on the object surface corresponding to each pixel in the image I34.

In step S104, the pixel coordinates of the pixel in the image I35 corresponding to each pixel in the image I34 are obtained through the corresponding-point searching processing.

In step S105, simultaneous equations of: an equation wherein the pixel coordinates specified in I34 and the camera parameters of the camera 34 are substituted into Expression 14; and an equation wherein the coordinates of the corresponding pixels in I35, obtained in step S104, and the camera parameters of the camera 35 are substituted into Expression 14 are solved to obtain world coordinates B of the point of interest on the object surface corresponding to each pixel in the image I34.

In step S106, for each pixel in the image I34, the two-point distance D1 between the world coordinates A and B is obtained.

In step S107, for each pixel in the image I34, whether or not the two-point distance D1 is smaller than or equal to a predetermined threshold is determined.

In step S108, if the two-point distance D1 is smaller than or equal to the predetermined threshold, it is considered that the world coordinates A and B both have small errors, and the coordinates of a midpoint between the two world coordinates A and B are regarded as the world coordinates of the corresponding point of interest on the surface of the object.

In step S109, if the two-point distance D1 is larger than the threshold, the corresponding point of interest on the surface of the object is determined to be "result not found" or is regarded as world coordinates with warning information that warns of a large error.

In the corresponding-point searching processing for searching for the correspondence between images, an algorithm for evaluating the similarity in the brightness-value distribution between images, such as block matching, is used. The similarity may be calculated by using a plurality of calculation methods, such as sum of squared difference (SSD), sum of absolute difference (SAD), normalized cross-correlation (NCC), zero-means normalized cross-correlation (ZNCC), or the like, according to the calculation speed and calculation precision requirements. Taking the robustness of the cameras 33, 34, and 35 against differences in brightness of the acquired images into consideration, ZNCC is desirable. Alternatively, the method may be selected from a plurality of these similarity calculation methods, on the basis of the balance with the calculation time.

Furthermore, it is desirable to perform the distortion correction processing described in the first example on the images I33, I34, and I35 to be used in the corresponding-point searching processing. By performing the corresponding-point searching processing on the images that have been subjected to the distortion correction processing, it is possible to obtain more precise corresponding point coordinates, in which the influence of the difference in optical properties between the cameras is reduced.

In step S105, the simultaneous equations are solved by first solving an equation for x and z, and then y is obtained using the obtained z. The camera model of Expression 14, in which the camera parameters of the camera 34 corresponding to the image I34, which is used to specify the pixels, are set, is used for the equation for obtaining y. When the optical axes of the multi-viewpoint cameras 33, 34, and 35 cannot be regarded as parallel, the rotation angles that have been obtained in the calibration stage by the same method as in the second embodiment are also used as the camera parameters to form camera models of Expression 14 and Expression 15 in which the camera parameters of the multi-viewpoint cameras 33, 34, and 35 are set. After the world coordinates are corrected with Expression 15, the simultaneous equations of Expression 14 are solved.

Is step S108, by using the world coordinates of the midpoint between the two world coordinates A and B, there is an effect of further reducing the error of the world coordinates to be obtained.

Herein, although a three-viewpoint camera has been described as an example, a two-viewpoint camera may also be used. In that case, the processing after step S104 is unnecessary.

Note that, in the descriptions of the respective steps, although the world coordinates of the pixels specified on the image I34 by a user are calculated, it is also possible to configure the system such that the world coordinates of a plurality of pixels that have been determined to have a feature by feature-point extracting processing performed on the image I34 are automatically calculated, or, when there is little limitation on the calculation resources, the calculation is performed with respect to all the pixels in the image I34.

Figure 8:
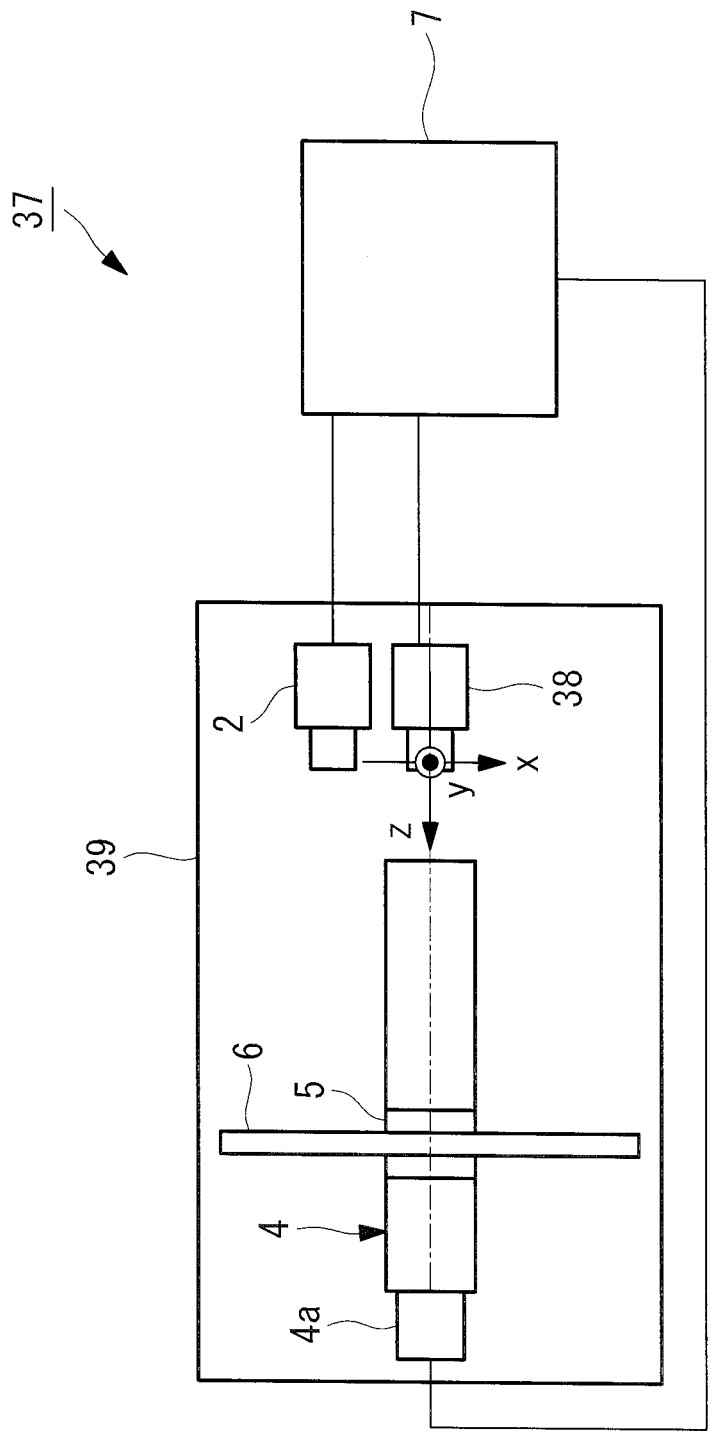
FIG. 8 is a schematic plan view of a calibration device according to a fourth embodiment of the present invention.

Next, a calibration device according to a fourth embodiment of the present invention will be described below with reference to FIG. 8. A calibration device according to this embodiment is a projector calibration device (second calibration device) 37 including, inside thereof, an image forming element (image conversion element, not shown), such as a liquid-crystal element, and a projection optical system (optical system, not shown), the projector calibration device calibrating a projector (projection device) 38 that projects an image to the outside. In this embodiment, the projector 38 is used as an example optical device.

The projector calibration device 37 includes: a base 39 to which the projector 38 to be calibrated is fixed; the z-axis moving stage 4 provided on the base 39; the calibration chart 6 fixed to the movable part 5 of the z-axis moving stage 4; and the camera 2 that is disposed at a position adjacent to the projector 38 and that acquires an image of the calibration chart 6. The camera 2 and the projector 38 are mounted to the projector calibration device 37 such that their optical axes are parallel to the z-axis of the projector calibration device 37 and such that a certain position in the projector 38 matches the coordinate origin.

Note that it is desirable that the image-acquisition area of the camera 2 cover the image projection range of the projector 38. The configurations of the other components, such as the calibration chart 6, the z-axis moving stage 4, and the computer 7, are the same as those in FIG. 1. Note that the calibration chart 6 used in this embodiment may be either the chessboard 10 in FIG. 2 or a plain screen, which are exchangeable. Furthermore, the computer 7 also has a function of controlling the projector 38 to cause the projector 38 to project a predetermined image.

When calibrating the projector 38 by using the thus-configured projector calibration device 37 according to this embodiment, first, the camera 2 is calibrated in a state in which the chessboard 10 in FIG. 2 is disposed as the calibration chart 6. The procedure therefor is the same as that in the first embodiment.

Next, the calibration chart 6 is replaced with the plain screen. Then, the pattern of the chessboard 10 in FIG. 2 is projected on the calibration chart 6 from the projector 38, through the projection optical system. At this time, the pixel coordinates of the grid points 11 and 13 on the chessboard 10 are known in the pixel coordinates defined on the image forming element (not shown) inside the projector 38.

In this state, as in the first embodiment, by means of the measurement program shown in the flowchart in FIG. 3, images of the calibration chart 6 on which the pattern on the chessboard 10 is projected are automatically captured by the camera 2 at a plurality of object distances, and, from these images, the pixel coordinates of the grid points 11 on the pattern on the chessboard 10 are acquired.

Thereafter, from the acquired pixel coordinates (u, v) and the object distances z of the calibration chart 6, the world coordinates (x, y) of the grid points 11 on the pattern on the chessboard 10 that is projected on the calibration chart 6 are obtained by using the camera model of the camera 2 calibrated through the above-described procedure. Through the above-described procedure, measurement data representing the correspondence between the pixel coordinates (u, v) and the world coordinates (x, y, z) in the projector 38 can be obtained. The method for obtaining the camera parameters of the projector 38 by applying the camera model of Expression 14 to this measurement data is the same as that in the first embodiment.

The camera model in which the thus-obtained camera parameters of the projector 38 are set can be used in the projector 38 provided with this camera model, as follows. Firstly, when the object distance z is known, by substituting the pixel coordinates (u, v) of the feature point of interest and the object distance z into the camera model of Expression 14, the world coordinates (x, y) of the feature point projected by the calibrated projector 38 can be obtained. Secondly, when it is intended to obtain a projection line corresponding to the pixel coordinates (u, v) of interest in the world coordinates, by substituting the pixel coordinates (u, v) of interest into Expression 11 and Expression 12, the slope and intercept of the projection line can be obtained.

Figure 5:
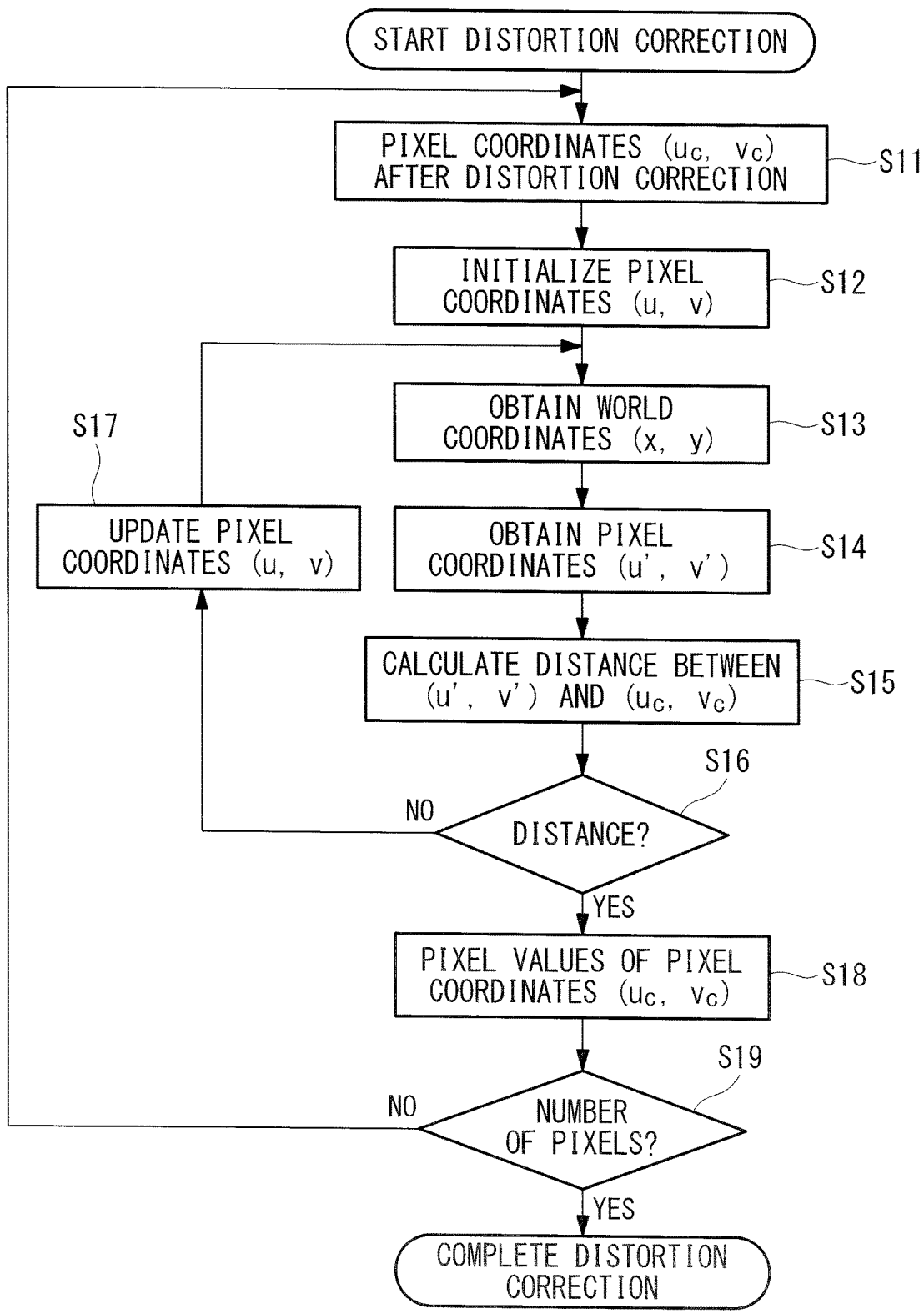
FIG. 5 is a flowchart showing a distortion correcting method.

Thirdly, when it is intended to project an image with no distortion, image distortion that cancels out the distortion produced by projection may be preliminarily added to the image formed by the image forming element of the projector 38. The procedure for obtaining the pixel coordinates in the distortion-corrected image is the same as that in the flowchart in the first embodiment, as shown in FIG. 5.

Note that the pattern projected by the projector 38 is not limited to the chessboard 10. A dot mark pattern, which enables the pixel coordinates of the feature points to be calculated from the image captured by the camera 2, may also be used. Alternatively, a method in which discrete pixels in the projector 38 are lit may be employed.

Furthermore, in this embodiment, the world coordinates (x, y) of the feature points projected by the projector 38 are measured with the preliminarily calibrated camera 2. The measurement thereof may also be performed by a method in which an image-acquisition element is disposed in place of the calibration chart 6, and an image of a projected pattern is directly captured. In addition, provided that the correspondence between the world coordinates and the pixel coordinates can be made clear, other acquisition methods may also be selected. In this way, the projector calibration device 37 according to this embodiment enables the projector 38 to be calibrated by using a camera model.

Next, a measuring system and a measuring method according to another embodiment of the present invention will be described with reference to the drawings.

The measuring system according to this embodiment includes the projector calibration device 37, the projector 38, and the three-dimensional-coordinate calculation processing unit (computer 7) according to the fourth embodiment.

By performing the calibration of the projector 38 using the projector calibration device 37, a camera model in which the camera parameters of the projector 38 are set is obtained from Expression 14. By performing the camera calibration according to the second embodiment on the camera 2 according to the fourth embodiment, a camera model in which the camera parameters of the camera 2 are set is obtained from Expression 14.

The projector 38 projects a random dot pattern image I38. The three-dimensional calculation processing unit accommodated in the computer 7 calculates, through the calculation processing including the following steps, the world coordinates of points of interest on the surface of an object an image of which is acquired by the camera 2. The random dot pattern may be generated by a known method. Alternatively, it may be formed by two-dimensionally arranging pseudorandom number sequences, such as M sequences.

Figure 10:
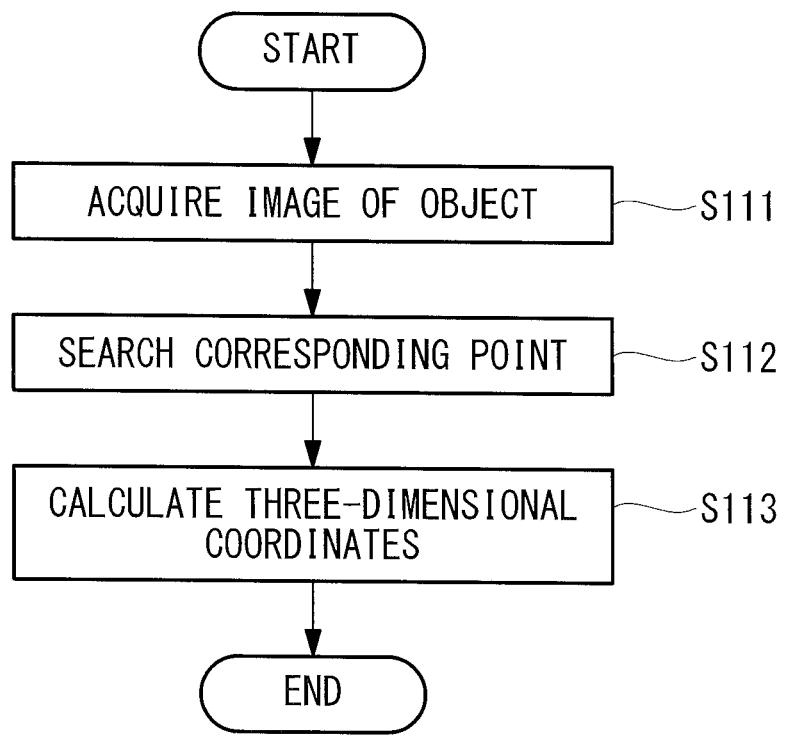
FIG. 10 is a flowchart showing a measuring method according to another embodiment of the present invention.

When the optical axis of the projector 38 and the optical axis of the camera 2 are arranged substantially parallel, the measuring method is as shown in FIG. 10.

In step S111, an object image I2, which is an image of an object captured by the camera 2, on which object a pattern (structured light) is projected by the projector 38, is read.

In step S112, the pixel coordinates of the pixels in the image I38 corresponding to the pixels specified on the image I2 by a user are obtained through the corresponding-point searching processing.

In step S113, simultaneous equations of: an equation wherein the pixel coordinates specified in the image I2 and the camera parameters of the camera 2 are substituted into Expression 14; and an equation wherein the coordinates of the corresponding pixels in the image I38, obtained in step S112, and the camera parameters of the projector 38 are substituted into Expression 14 to obtain the world coordinates of the points of interest on the object surface corresponding to the respective pixels in the image I2.

In step S113, the simultaneous equations are solved by first solving an equation for x and z, and then y is obtained using the obtained z. The camera model of Expression 14, in which the camera parameters of the camera 2 corresponding to the image I2, which is used to specify the pixels, are set, is used for the equation for obtaining y. When the optical axis of the projector 38 and the optical axis of the camera 2 cannot be regarded as parallel, the rotation angles thereof that have been obtained in the calibration stage through the same procedure as in the second embodiment are also used as the camera parameters to form camera models of Expression 14 and Expression 15 for the projector 38 and the camera 2. After the world coordinates are corrected with Expression 15, the simultaneous equations of Expression 14 are solved.

Herein, although an example case where the projector 38 projects one type of a pseudorandom pattern as a pattern has been described, it is also possible to employ a phase-shift method, in which a plurality of object images wherein a plurality of out-of-phase bands are projected at different times are used, or a space coding method, in which a plurality of images wherein binary patterns having a plurality of resolutions are projected are used. Furthermore, although an example case where the number of projectors 38 is one has been shown, there may be a plurality of projectors 38 for one camera 2, or a plurality of projectors 38 for a plurality of cameras 2.

Note that, in the descriptions of the respective steps, although the world coordinates of the pixels specified on the image I2 by the user are calculated, it is also possible to configure the system such that the three-dimensional coordinates of a plurality of pixels that have been determined to have a feature by feature-point extracting processing performed on the image I2 are automatically calculated, or, when there is little limitation on the calculation resources, the calculation is performed with respect to all the pixels in the image I2.

Next, a camera calibration method according to a fifth embodiment of the present invention will be described below with reference to FIGS. 1, 4A, and 6A.

In the first to fourth embodiments, the camera calibration methods when the pupil aberration of the camera 2 to be calibrated cannot be ignored have been described. In this embodiment, a camera calibration method when the pupil aberration can be ignored will be described.

The capability of ignoring the pupil aberration of the camera 2 is equivalent to all the backprojection lines intersecting at one point at the center of the entrance pupil 25. Accordingly, the camera 2 can be calibrated using the camera model of Expression 16, in which the coefficients with subscript B in the camera model of Expression 14 are omitted.

$$\begin{pmatrix} x' \\ y' \end{pmatrix} = k'_{A0} z' \begin{pmatrix} u \\ v \end{pmatrix} + k'_{A1} z' r^2 \begin{pmatrix} u \\ v \end{pmatrix} + $$

$$p'_{A1} z' \begin{pmatrix} r^2 + 2u^2 \\ 2uv \end{pmatrix} + p'_{A2} z' \begin{pmatrix} 2uv \\ r^2 + 2v^2 \end{pmatrix} + \begin{pmatrix} \Delta u'_A z' \\ \Delta v'_A z' \end{pmatrix}$$

{Expression 16}

Note that the center of the entrance pupil 25 in FIG. 4A and the origin of the world coordinates (x, y, z) do not necessarily match. Hence, by converting the world coordinates (x, y, z) of the grid points 11 into world coordinate (x', y', z'), as in Expression 17, with the translation vector T in Expression 2, which shows the translation of them, they become applicable to the camera model of Expression 16.

$$\begin{pmatrix} x' \\ y' \\ z' \end{pmatrix} = \begin{pmatrix} x \\ y \\ z \end{pmatrix} + \begin{pmatrix} t_x \\ t_y \\ t_z \end{pmatrix}$$

{Expression 17}

Specifically, in the fifth embodiment, only the world coordinates of the measurement data representing the correspondence between the world coordinates (x, y, z) of a plurality of grid points 11 and the pixel coordinates (u, v), measured in the arrangement in FIG. 1, are converted into the world coordinates (x', y', z') by Expression 17, and then the camera model of Expression 16 is applied thereto.

Next, a procedure for optimizing the camera model by the camera calibration method according to the fifth embodiment will be described.

First, measurement data representing the correspondence between the world coordinates (x, y, z) and the pixel coordinates (u, v) is obtained in the same way as in the first embodiment. Next, translation vector components tx, ty, and tz, serving as the optimization parameters, are repeatedly optimized by using, as an evaluation function, the standard deviation of the residual error when the camera model of Expression 16 is applied to the pixel coordinates (u, v) of the measurement data and the world coordinates (x', y', z') after translation by a linear least-squares method.

The initial values of the translation vector components tx, ty, and tz may be zero. Alternatively, when they can be estimated by some method, they may be used as the initial values.

This repeated optimization can be performed by a typical algorithm, such as a downhill simplex method. The translation vector components tx, ty, and tz when the evaluation function converges to a minimum value are the optimum translation vectors.

The thus-obtained camera model of Expression 16 is a camera model in the world coordinate (x', y', z') after translation. This camera model of Expression 16 can be converted into the format of the camera model of Expression 14 in the original world coordinates (x, y, z) by using the optimized translation vector components tx, ty, and tz and Expression 17.

Hence, the camera model in which the camera parameters obtained by the camera calibration method according to this embodiment are set can be used in an image-acquisition device including the camera 2 that is provided with this camera model, as in the first to fourth embodiments.

In this embodiment, three translation vector components tx, ty, and tz are optimized. However, when some of these translation components are known, they may be fixed by the known values and excluded from the optimization parameters. In that case, only the remaining one or a plurality of unknown translation components may be optimized. By doing so, the number of optimization parameters is reduced, and thus, the calculation time can be reduced.

Furthermore, this embodiment may be used in combination with the second embodiment. Specifically, as in FIG. 6A, when the camera 2 that is not parallel to the world coordinate axis is to be calibrated using the camera model of Expression 16, in which the pupil aberration is ignored, the necessary components from the translation vector components tx, ty, and tz and the rotation angles θx, θy, and θz, serving as the optimization parameters, may be repeatedly optimized by using the standard deviation of the residual error when the camera model of Expression 16 is applied by a linear least-squares method as an evaluation function.

In this way, according to the camera calibration method according to this embodiment, the number of camera parameters can be reduced when the camera 2 in which the pupil aberration can be ignored is to be calibrated. Furthermore, even when a large number of camera parameters, such as distortion, are needed, because the number of parameters for repeated optimization is limited to three or fewer translation components and three or fewer rotation angles, the optimization of the camera model does not fail, and the calculation time can be significantly reduced.

Furthermore, in the first to fifth embodiments of the present invention, a plurality of camera calibrations corresponding to changes in settings, such as the focus, zoom, and stop, of the camera 2 or the projector 38 may be performed. Furthermore, a camera model corresponding to an arbitrary setting may be obtained by interpolating these camera models.

In addition, camera calibration may be performed under a plurality of wavelengths of a light source. Furthermore, wavelength-specific camera models may be used in wavelength-specific cameras. Furthermore, in the optical devices according to the first to fifth embodiments of the present invention, although the image-acquisition element 18 and the image forming element are used as an example image conversion element, the image conversion element is not limited thereto, and anything that converts between an image and a video signal may be used.

As a result, the above-described embodiments lead the following aspects.

An aspect of the present invention is a calibration device for an optical device provided with a two-dimensional image conversion element having a plurality of pixels, and an optical system that forms an image-formation relationship between the image conversion element and the three-dimensional world coordinate space. The calibration device includes: a calibration-data acquisition unit that acquires calibration data representing the correspondence between two-dimensional pixel coordinates in the image conversion element and three-dimensional world coordinates in the world coordinate space; and a parameter calculating unit that calculates parameters of a camera model by applying, to the calibration data acquired by the calibration-data acquisition unit, a camera model that expresses two coordinate values of the three-dimensional world coordinates as functions of the other one coordinate value of the world coordinates and the two coordinate values of the two-dimensional pixel coordinates.

According to this aspect, as a result of the camera model being applied, in the parameter calculating unit, to the calibration data representing the correspondence between two-dimensional pixel coordinates in the image conversion element and three-dimensional world coordinates in the world coordinate space, acquired by the calibration-data acquisition unit, the parameters of the camera model are calculated. In the calculation of the parameters, the camera model in which two coordinate values in the three-dimensional world coordinates are expressed as functions of the other one coordinate value of the world coordinates and the two coordinate values of the two-dimensional pixel coordinates. By doing so, precise parameters of the camera model can be quickly obtained without excessively performing repeated optimization, by means of the linear model showing the image-formation relationship between the world coordinates and the pixel coordinates, including distortion.

In the above aspect, the camera model may express a straight line in the world coordinate space by a linear sum of multiple two-dimensional vector functions whose elements are functions of the other one coordinate value of the world coordinates and the two coordinate values of the two-dimensional pixel coordinates.

With this configuration, precise parameters for easily obtaining a straight line in the world coordinate space corresponding to the respective pixels in the two-dimensional image can be quickly obtained from the coordinate values of the two-dimensional pixel in the image conversion element and the one coordinate value of the world coordinates.

Furthermore, in the above aspect, the camera model may be expressed by an expression in which the respective coefficients in a linear image-forming model representing the image-formation relationship between the two pixel coordinate values of a point on a two-dimensional pixel coordinate plane and two world coordinate values of a point on a plane that is made to be optically conjugate with the pixel coordinate plane by the optical system are replaced with a linear equation of the other one world coordinate.

Furthermore, in the above aspect, the calibration-data acquisition unit may acquire a plurality of pieces of calibration data representing the correspondence between the three coordinate values of a point on each of two planes in the world coordinate space and the two coordinate values of the two-dimensional pixel coordinates corresponding to each point.

Furthermore, in the above aspect, the parameter calculating unit may apply the camera model to a plurality of pieces of calibration data representing the correspondence between the three coordinate values of a point on each of two planes in the world coordinate space and the two coordinate values of the two-dimensional pixel coordinates corresponding to each point.

Furthermore, in the above aspect, the calibration-data acquisition unit may acquire a plurality of pieces of calibration data representing the correspondence between the two coordinate values of the two-dimensional pixel coordinates and the slope and intercept of a straight line in the world coordinates.

Furthermore, in the above aspect, the parameter calculating unit may apply the camera model to the calibration data by a linear least-squares method.

Furthermore, in the above aspect, the parameter calculating unit may apply the camera model to calibration data, in the calibration data acquired by the calibration-data acquisition unit, in which the three-dimensional world coordinates have been converted into world coordinates obtained by being rotated by one or more of three rotation angles representing the rotation of the world coordinates to obtain one or more rotation angles with which the residual error of the camera model is minimum.

Furthermore, in the above aspect, the parameter calculating unit may obtain one or more translation components with which the residual error of the camera model is minimum by applying the camera model to calibration data, in the calibration data acquired by the calibration-data acquisition unit, in which the three-dimensional world coordinates have been converted into world coordinates obtained by being translated by one or more of three translation components representing the translation of the world coordinates.

Furthermore, in the above aspect, the optical device may include a plurality of image conversion elements and an optical system that forms the image-formation relationship between the image conversion elements and the three-dimensional world coordinate space. The calibration-data acquisition unit may acquire calibration data for the respective image conversion elements and the optical system, and the parameter calculating unit may apply, to the calibration data for the respective image conversion elements and the optical system, a camera model expressed as a function of the two-dimensional pixel coordinates of the respective image conversion elements.

Furthermore, in the above aspect, the optical device may be an image-acquisition device, the image conversion element may an image-acquisition element, and the optical system may be an image-acquisition optical system.

Furthermore, in the above aspect, the optical device may be a projection device, the image conversion element may be an image forming element, and the optical system may be a projection optical system.

Furthermore, another aspect of the present invention is a calibration method for an optical device provided with a two-dimensional image conversion element having a plurality of pixels, and an optical system that forms an image-formation relationship between the image conversion element and the three-dimensional world coordinate space. The calibration method includes: a step of acquiring calibration data representing the correspondence between two-dimensional pixel coordinates in the image conversion element and three-dimensional world coordinates in the world coordinate space; and a step of calculating parameters of a camera model by applying, to the acquired calibration data, a camera model that expresses two coordinate values of the three-dimensional world coordinates as functions of the other one coordinate value of the world coordinates and the two coordinate values of the two-dimensional pixel coordinates.

In the above aspect, the camera model may express a straight line in the world coordinate space by a linear sum of multiple two-dimensional vector functions whose elements are functions of the other one coordinate value of the world coordinates and the two coordinate values of the two-dimensional pixel coordinates.

Furthermore, in the above aspect, the camera model may be expressed by an expression in which the respective coefficients in a linear image-forming model representing the image-formation relationship between the two pixel coordinate values of a point on a two-dimensional pixel coordinate plane and two world coordinate values of a point on a plane that is made to be optically conjugate with the pixel coordinate plane by the optical system are replaced with a linear equation of the other one world coordinate.

Furthermore, in the above aspect, in the step of acquiring calibration data, a plurality of pieces of calibration data representing the correspondence between two coordinate values on two planes in the world coordinate space and the two coordinate values of the two-dimensional pixel coordinates may be acquired.

Furthermore, in the above aspect, in the step of calculating parameters, the camera model may be applied to a plurality of pieces of calibration data representing the correspondence between two coordinate values on two planes in the world coordinate space and the two coordinate values of the two-dimensional pixel coordinates.

Furthermore, in the above aspect, in the step of acquiring calibration data, a plurality of pieces of calibration data representing the correspondence between the two coordinate values of the two-dimensional pixel coordinates and the slope and intercept of a straight line in the world coordinates may be acquired.

Furthermore, in the above aspect, in the step of calculating parameters, the camera model may be applied to the calibration data by a linear least-squares method.

Furthermore, in the above aspect, in the step of calculating parameters, in the calibration data acquired in the step of acquiring the calibration data, the camera model may be applied to calibration data in which the three-dimensional world coordinates have been converted into world coordinates obtained by being rotated by one or more of three rotation angles representing the rotation of the world coordinates to obtain one or more rotation angles with which the residual error of the camera model is minimum.

Furthermore, in the above aspect, in the step of calculating parameters, in the calibration data acquired in the step of acquiring the calibration data, the camera model may be applied to calibration data in which the three-dimensional world coordinates have been converted into world coordinates obtained by being translated by one or more of three translation components representing the translation of the world coordinates to obtain one or more translation components with which the residual error of the camera model is minimum.

Furthermore, another aspect of the present invention is an optical device provided with a camera model in which the parameters calculated by the above-described calibration device are set.

Furthermore, in the above aspect, the camera model may be held as discrete data representing the correspondence between a plurality of pixel coordinates and world coordinates on two planes.

Furthermore, in the above aspect, the camera model may be held as discrete data representing the correspondence between a plurality of pixel coordinates and the slope and intercept of a straight line in the world coordinate space.

Furthermore, in the above aspect, a world-coordinate calculating unit that obtains, by means of the camera model, the two coordinate values of the three-dimensional world coordinates from the other one coordinate value of the world coordinates and the two coordinate values of the two-dimensional pixel coordinates may be provided.

With this configuration, with the world-coordinate calculating unit, the two coordinate values of the three-dimensional world coordinates can be easily obtained from the pixel coordinates in the acquired image.

Furthermore, in the above aspect, a straight-line calculating unit that obtains, by means of the camera model, a straight line in the world coordinate space corresponding to the pixel coordinates from the two coordinate values of the two-dimensional pixel coordinates may be provided.

Furthermore, in the above aspect, a distortion-corrected image generating unit that obtains, by means of the camera model, the world coordinates corresponding to pixel coordinates in an image acquired or formed by the image conversion element and generates a distortion-corrected image may be provided.

Furthermore, another aspect of the present invention is an optical device provided with a camera model in which the rotation angle and/or the translation component acquired by the above-described calibration device are set as parameters.

In the above aspect, a world-coordinate rotating unit and/or a world-coordinate translation unit that converts the world coordinates after rotation and/or translation into the world coordinates before rotation and/or translation by the rotation angle and/or the translation component may be provided.

Furthermore, another aspect of the present invention is an image-acquisition device including the above-described optical device.

Furthermore, another aspect of the present invention is a projection device including the above-described optical device Furthermore, another aspect of the present invention is a measuring system including: the above-described calibration device; one or more above-described image-acquisition devices; and a three-dimensional-coordinate calculation processing unit that calculates the three-dimensional coordinates of points of interest on an object from pixel coordinates in images acquired by the image-acquisition device at a plurality of viewpoints. The three-dimensional-coordinate calculation processing unit uses the camera model used in the calibration device and the parameters of the camera model in the image-acquisition device, calculated by the calibration device.

Furthermore, another aspect of the present invention is a measuring system including: a first calibration device, serving as the above-described calibration device; a second calibration device, serving as the above-described calibration device; one or more above-described image-acquisition devices; one or more above-described projection devices; and a three-dimensional-coordinate calculation processing unit that calculates the three-dimensional coordinates of points of interest on an object from pixel coordinates in an image of the object acquired by the image-acquisition device, on which object structured light from the projection device is projected. The three-dimensional-coordinate calculation processing unit uses the camera models used in the first and the second calibration devices, the parameters of the camera model in the image-acquisition device calculated by the first calibration device, and the parameters of the camera model in the projection device calculated by the second calibration device.

Furthermore, another aspect of the present invention is a measuring method for calculating, by using the camera model used in the above-described calibration device, and the parameters of the camera model in one or more above-described image-acquisition devices, calculated by the calibration device, the three-dimensional coordinates of points of interest on an object from pixel coordinates in images acquired by the image-acquisition device at a plurality of viewpoints.

Furthermore, another aspect of the present invention is a measuring method for calculating, by using the camera models used in the first calibration device, serving as the above-described calibration device, and the second calibration device, serving as the above-described calibration device, the parameters of the camera model in one or more above-described image-acquisition devices, calculated by the first calibration device, and the parameters of the camera model in one or more above-described projection devices, calculated by the second calibration device, the three-dimensional coordinates of points of interest on an object from pixel coordinates in an image of the object acquired by the image-acquisition device, on which object structured light from the projection device is projected.

The present invention provides an advantage in that it is possible to quickly obtain precise camera parameters.

REFERENCE SIGNS LIST 1, 32 camera calibration device (calibration device)
2 camera (image-acquisition device, optical device)
7 computer (parameter calculating unit)
8 calibration-data acquisition unit
14 image-acquisition optical system (optical system)
15, 16 lens (optical system)
18 image-acquisition element (image conversion element)
37 projector calibration device (calibration device)
38 projector (projection device, optical device)

The invention claimed is:

1. A calibration device for an optical device provided with a two-dimensional image conversion element having a plurality of pixels, and an optical system that forms an image-formation relationship between the image conversion element and the three-dimensional world coordinate space, the calibration device comprising:
a calibration-data acquisition unit that acquires calibration data representing the correspondence between two-dimensional pixel coordinates in the image conversion element and three-dimensional world coordinates in the world coordinate space; and
a parameter calculating unit that calculates parameters of a camera model by applying, to the calibration data acquired by the calibration-data acquisition unit, a camera model that expresses two coordinate values of the three-dimensional world coordinates as functions of the other one coordinate value of the world coordinates and the two coordinate values of the two-dimensional pixel coordinates.

2. The calibration device according to claim 1, wherein the camera model expresses a straight line in the world coordinate space by a linear sum of multiple two-dimensional vector functions whose elements are functions of the other one coordinate value of the world coordinates and the two coordinate values of the two-dimensional pixel coordinates.

3. The calibration device according to claim 2, wherein the camera model is expressed by an expression in which the respective coefficients in a linear image-forming model representing the image-formation relationship between the two pixel coordinate values of a point on a two-dimensional pixel coordinate plane and two world coordinate values of a point on a plane that is made to be optically conjugate with the pixel coordinate plane by the optical system are replaced with a linear equation of the other one world coordinate.

4. The calibration device according to claim 1, wherein the calibration-data acquisition unit acquires a plurality of pieces of calibration data representing the correspondence between the three coordinate values of a point on each of two planes in the world coordinate space and the two coordinate values of the two-dimensional pixel coordinates corresponding to each point.

5. The calibration device according to claim 1, wherein the parameter calculating unit applies the camera model to a plurality of pieces of calibration data representing the correspondence between the three coordinate values of a point on each of two planes in the world coordinate space and the two coordinate values of the two-dimensional pixel coordinates corresponding to each point.

6. The calibration device according to claim 1, wherein the calibration-data acquisition unit acquires a plurality of pieces of calibration data representing the correspondence between the two coordinate values of the two-dimensional pixel coordinates and the slope and intercept of a straight line in the world coordinates.

7. The calibration device according to claim 1, wherein the parameter calculating unit applies the camera model to the calibration data by a linear least-squares method.

8. The calibration device according to claim 1, wherein the parameter calculating unit obtains one or more rotation angles with which the residual error of the camera model is minimum by applying the camera model to calibration data, in the calibration data acquired by the calibration-data acquisition unit, in which the three-dimensional world coordinates have been converted into world coordinates obtained by being rotated by one or more of three rotation angles representing the rotation of the world coordinates.

9. The calibration device according to claim 1, wherein the parameter calculating unit obtains one or more translation components with which the residual error of the camera model is minimum by applying the camera model to calibration data, in the calibration data acquired by the calibration-data acquisition unit, in which the three-dimensional world coordinates have been converted into world coordinates obtained by being translated by one or more of three translation components representing the translation of the world coordinates.

10. The calibration device according to claim 1, wherein
the optical device includes a plurality of image conversion elements and an optical system that forms the image-formation relationship between the image conversion elements and the three-dimensional world coordinate space,
the calibration-data acquisition unit acquires calibration data for the respective image conversion elements and the optical system, and
the parameter calculating unit applies, to the calibration data for the respective image conversion elements and the optical system, a camera model expressed as a function of the two-dimensional pixel coordinates of the respective image conversion elements.

11. The calibration device according to claim 1, wherein
the optical device is an image-acquisition device,
the image conversion element is an image-acquisition element, and
the optical system is an image-acquisition optical system.

12. The calibration device according to claim 1, wherein
the optical device is a projection device,
the image conversion element is an image forming element, and
the optical system is a projection optical system.

13. A calibration method for an optical device provided with a two-dimensional image conversion element having a plurality of pixels, and an optical system that forms an image-formation relationship between the image conversion element and the three-dimensional world coordinate space, the calibration method comprising:
a step of acquiring calibration data representing the correspondence between two-dimensional pixel coordinates in the image conversion element and three-dimensional world coordinates in the world coordinate space; and
a step of calculating parameters of a camera model by applying, to the acquired calibration data, a camera model that expresses two coordinate values of the three-dimensional world coordinates as functions of the other one coordinate value of the world coordinates and the two coordinate values of the two-dimensional pixel coordinates.

14. The calibration method according to claim 13, wherein the camera model expresses a straight line in the world coordinate space by a linear sum of multiple two-dimensional vector functions whose elements are functions of the other one coordinate value of the world coordinates and the two coordinate values of the two-dimensional pixel coordinates.

15. The calibration method according to claim 14, wherein the camera model is expressed by an expression in which the respective coefficients in a linear image-forming model representing the image-formation relationship between the two pixel coordinate values of a point on a two-dimensional pixel coordinate plane and two world coordinate values of a point on a plane that is made to be optically conjugate with the pixel coordinate plane by the optical system are replaced with a linear equation of the other one world coordinate.

16. The calibration method according to claim 13, wherein, in the step of acquiring calibration data, a plurality of pieces of calibration data representing the correspondence between two coordinate values on two planes in the world coordinate space and the two coordinate values of the two-dimensional pixel coordinates are acquired.

17. The calibration method according to claim 13, wherein, in the step of calculating parameters, the camera model is applied to a plurality of pieces of calibration data representing the correspondence between two coordinate values on two planes in the world coordinate space and the two coordinate values of the two-dimensional pixel coordinates.

18. The calibration method according to claim 13, wherein, in the step of acquiring calibration data, a plurality of pieces of calibration data representing the correspondence between the two coordinate values of the two-dimensional pixel coordinates and the slope and intercept of a straight line in the world coordinates are acquired.

19. The calibration method according to claim 13, wherein, in the step of calculating parameters, the camera model is applied to the calibration data by a linear least-squares method.

20. The calibration method according to claim 13, wherein, in the step of calculating parameters, in the calibration data acquired by the calibration-data acquisition unit, the camera model is applied to calibration data in which the three-dimensional world coordinates have been converted into world coordinates obtained by being rotated by one or more of three rotation angles representing the rotation of the world coordinates to obtain one or more rotation angles with which the residual error of the camera model is minimum.

21. The calibration method according to claim 13, wherein, in the step of calculating parameters, in the calibration data acquired by the calibration-data acquisition unit, the camera model is applied to calibration data in which the three-dimensional world coordinates have been converted into world coordinates obtained by being translated by one or more of three translation components representing the translation of the world coordinates to obtain one or more translation components with which the residual error of the camera model is minimum.

22. An optical device provided with a camera model in which the parameters calculated by the calibration device according to claim 1 are set.

23. The optical device according to claim 22, wherein the camera model is held as discrete data representing the correspondence between a plurality of pixel coordinates and world coordinates on two planes.

24. The optical device according to claim 22, wherein the camera model is held as discrete data representing the correspondence between a plurality of pixel coordinates and the slope and intercept of a straight line in the world coordinate space.

25. The optical device according to claim 22, comprising a world-coordinate calculating unit that obtains, by means of the camera model, the two coordinate values of the three-dimensional world coordinates from the other one coordinate value of the world coordinates and the two coordinate values of the two-dimensional pixel coordinates.

26. The optical device according to claim 22, comprising a straight-line calculating unit that obtains, by means of the camera model, a straight line in the world coordinate space corresponding to the pixel coordinates from the two coordinate values of the two-dimensional pixel coordinates.

27. The optical device according to claim 22, comprising a distortion-corrected image generating unit that obtains, by means of the camera model, the world coordinates corresponding to pixel coordinates in an image acquired or formed by the image conversion element and generates a distortion-corrected image.

28. An optical device provided with a camera model in which the rotation angle and/or the translation component acquired by the calibration device according to claim 8 are set as parameters.

29. The optical device according to claim 28, comprising a world-coordinate rotating unit and/or a world-coordinate translation unit that converts the world coordinates after rotation and/or translation into the world coordinates before rotation and/or translation by the rotation angle and/or the translation component.

30. An optical device provided with a camera model in which the rotation angle and/or the translation component acquired by the calibration device according to claim 9 are set as parameters.

31. The optical device according to claim 30, comprising a world-coordinate rotating unit and/or a world-coordinate translation unit that converts the world coordinates after rotation and/or translation into the world coordinates before rotation and/or translation by the rotation angle and/or the translation component.

* * * * *